(12) United States Patent
Sugita et al.

(10) Patent No.: US 6,841,282 B2
(45) Date of Patent: Jan. 11, 2005

(54) FUEL CELL

(75) Inventors: Narutoshi Sugita, Utsunomiya (JP);
Seiji Sugiura, Utsunomiya (JP);
Masajiro Inoue, Shioya-gun (JP);
Hideaki Kikuchi, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 128 days.

(21) Appl. No.: 10/328,970

(22) Filed: Dec. 24, 2002

(65) Prior Publication Data

US 2003/0129466 A1 Jul. 10, 2003

(30) Foreign Application Priority Data

Dec. 27, 2001 (JP) ........................................ 2001-396964

(51) Int. Cl.⁷ ................................................ H01M 8/04
(52) U.S. Cl. ............................. 429/26; 429/35; 429/38
(58) Field of Search ............................. 429/26, 35, 38

(56) References Cited

U.S. PATENT DOCUMENTS 6,593,022 B1 * 7/2003 McLean ...................... 429/38
2002/0192522 A1 * 12/2002 Wada et al. .................. 429/26
2002/0192532 A1 * 12/2002 Inagaki et al. ................ 429/39

* cited by examiner

Primary Examiner—John S. Maples
(74) Attorney, Agent, or Firm—Lahive & Cockfield, LLP; Anthony A. Laurentano, Esq.

(57) ABSTRACT

A fuel cell is provided that is reduced in both size and weight while securing a sealed state of respective flow passages by respective sealing members between separators and an electrode assembly. In this fuel cell, there are provided in each of the separators communication ports for reaction gases and cooling medium that are provided outward from gas sealing members, and communication paths that detour around the gas sealing members in the thickness direction of the separators and connect the reaction gas communication ports with gas flow passages. A cooling surface sealing member that seals off the cooling medium flow passage from the reaction gas communication ports is placed at a position shifted from the communication paths towards the communication holes. In addition, convex portions are provided between the reaction gas flow passages and the communications ports of one separator, while concave portions that receive the convex portion are provided in the other separator, and convex portions are formed behind the concave portions.

7 Claims, 30 Drawing Sheets

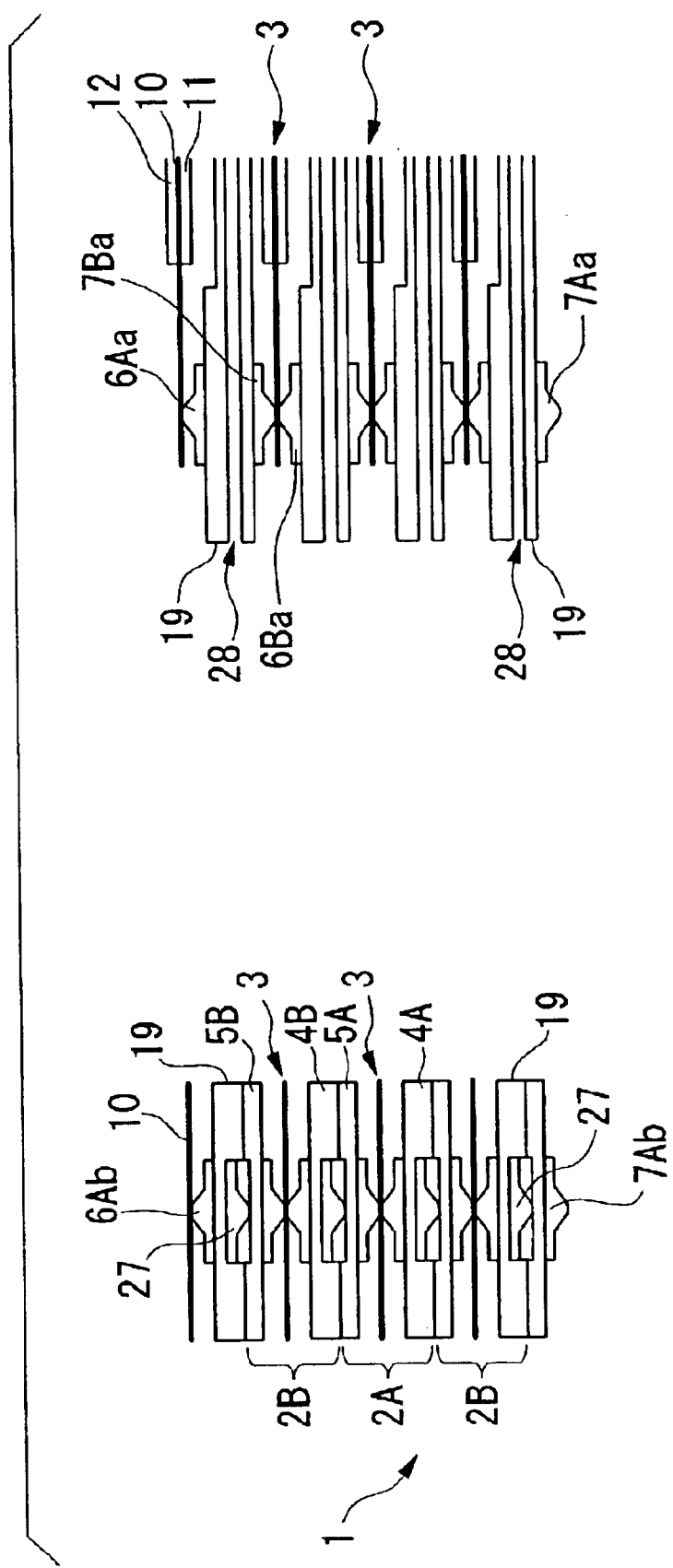

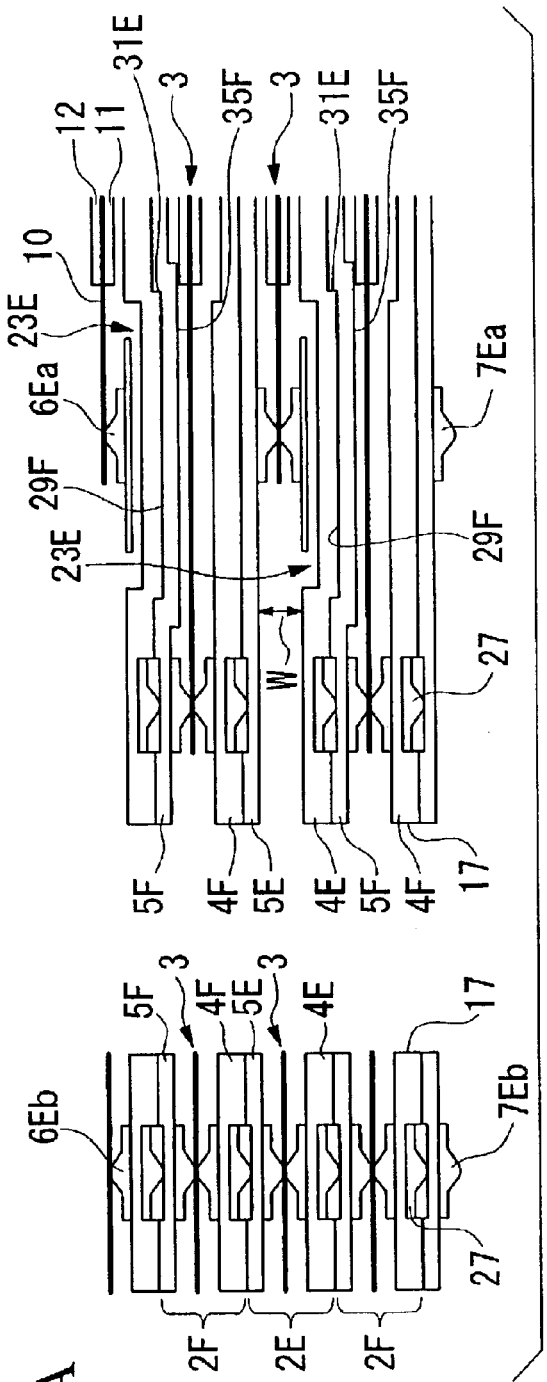
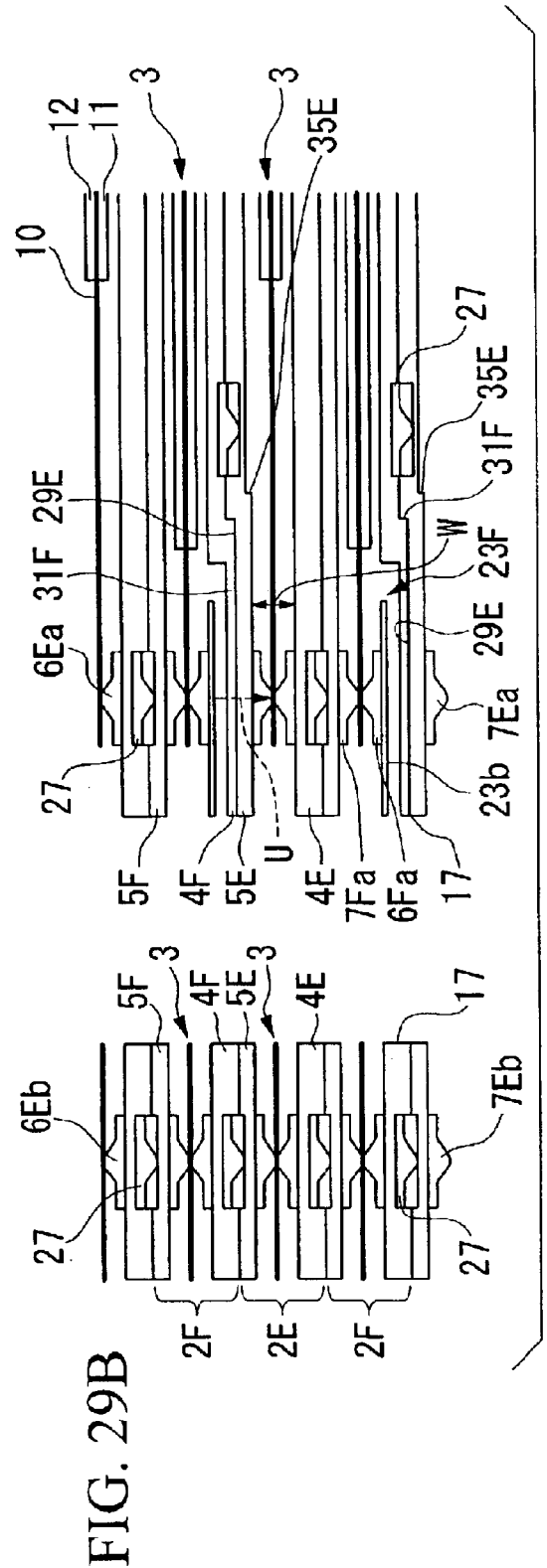
FIG. 29A
FIG. 29B

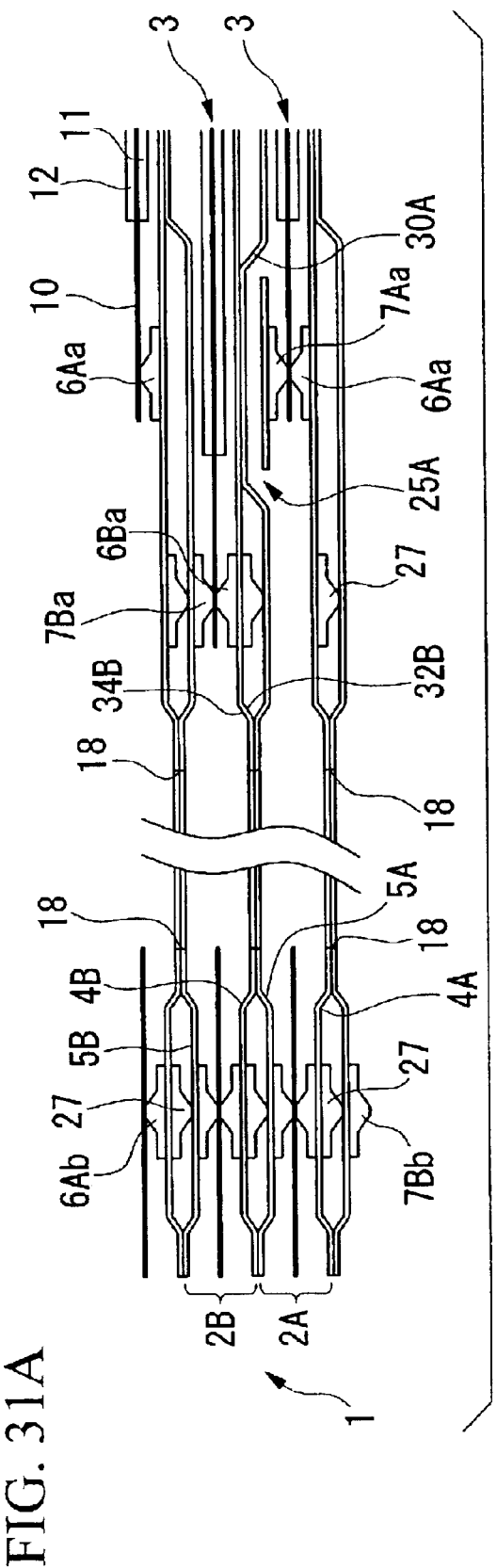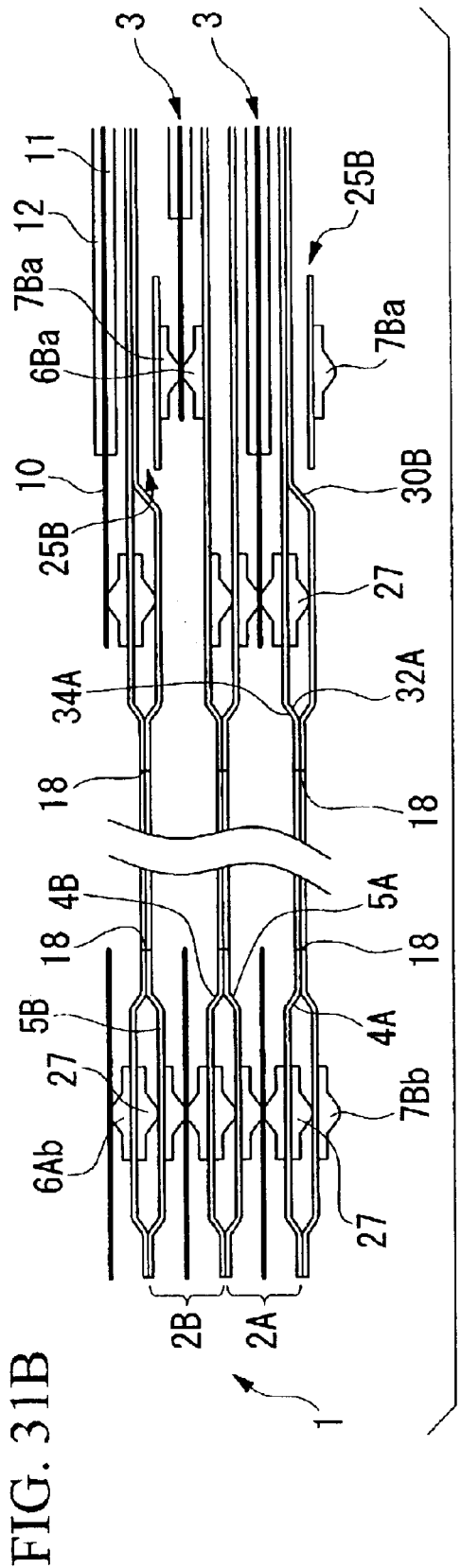
FIG. 31A
FIG. 31B

FUEL CELL

BACKGROUND OF THE INVENTION

1. Field of the Invention

The present invention relates to a fuel cell formed by stacking a plurality of fuel cell units that are formed by sandwiching an electrode assembly between a pair of separators.

2. Description of the Related Art

Among fuel cell units, there is one type that is formed in a plate shape by sandwiching between a pair of separators an electrode assembly that is formed by placing an anode electrode and a cathode electrode respectively on either side of a solid polymer electrolyte membrane. A fuel cell is formed by stacking in the thickness direction of the fuel cell units a plurality of fuel cell units that are structured in this way.

In each fuel cell unit there is provided a flow passage for fuel gas (for example, hydrogen) on the surface of the anode side separator that is positioned facing the anode electrode, and there is provided a flow passage for oxidizing gas (for example, air that contains oxygen) on the surface of the cathode side separator that is positioned facing the cathode electrode. In addition, a flow passage for a cooling medium (for example, pure water) is provided between adjacent separators of adjacent fuel cell units.

When fuel gas is supplied to the electrode reaction surface of the anode electrode, hydrogen is ionized here and moves to the cathode electrode via the solid polymer electrolyte membrane. Electrons generated during this reaction are extracted to an external circuit and used as direct current electrical energy. Because oxidizing gas is supplied to the cathode electrode, hydrogen ions, electrons, and oxygen react to generate water. Because heat is generated when water is created at the electrode reaction surface, the electrode reaction surface is cooled by a cooling medium made to flow between the separators.

The fuel gas, oxidizing gas (generically known as reaction gas), and the cooling medium each need to flow through a separate flow passage. Therefore, sealing technology that keeps each flow passage sealed in a fluid-tight or airtight condition is essential.

Examples of portions that must be sealed are: the peripheries of penetrating supply ports formed in order to supply and distribute reaction gas and cooling medium to each fuel cell unit of the fuel cell; the peripheries of discharge ports that collect and discharge the reaction gas and cooling medium that are discharged from each fuel cell unit; the outer peripheries of the electrode assemblies; and the outer peripheries between the separators of adjacent fuel cell units. Organic rubber that is soft yet also has the appropriate resiliency or the like is employed as the material for the sealing member.

In recent years, however, size and weight reduction, as well as a reduction in the cost of fuel cells, have become the main barriers in progress towards the more widespread application of fuel cells through their being mounted in practical vehicles.

Methods that have been considered for reducing the size of a fuel cell include making each fuel cell unit forming the fuel cell thinner, more specifically, reducing the size of the space between separators while maintaining a maximum size for the reaction gas flow passage formed inside each fuel cell unit; and also making the separators thinner.

However, a limit is imposed on how thin the separators can be made by the strength requirements for each separator and by the rigidity requirements for the fuel cell. Reducing the height of the sealing members is effective in reducing the size of the spacing between separators, however, the height of the sealing members needs to be sufficient for the sealing members to be able to be pressed down sufficiently to ensure that the required sealing performance is obtained. Therefore, there is also a limit to how much the height of the sealing members can be reduced.

Furthermore, in a fuel cell unit, although the volume occupied by the sealing members is indispensable in order for the reaction gas and cooling medium to be sealed in, because this space contributes substantially nothing to power generation, it must be made as small as possible.

FIG. 35 is a plan view showing a conventional fuel cell. In FIG. 35 the symbol 107 indicates a communication port such as a fuel gas supply port and discharge port, an oxidizing gas supply port and discharge port, and a cooling medium supply port and discharge port that each penetrate a fuel cell stack 106 in the direction in which separators 109 and 110 are stacked. The symbol 112 indicates an area formed by a plurality of fuel gas flow passages, oxidizing gas flow passages, and cooling medium flow passages running along the separators 109 and 110.

FIG. 36 is a longitudinal cross-sectional view of a conventional fuel cell stack 106 taken along the line F—F in FIG. 35. As can be seen in plan view, in order to make the volume occupied by the sealing member, which does not contribute to power generation, as small as possible, conventionally, by locating gas sealing members 102 and 103, which respectively seal a fuel gas flow passage 100 and an oxidizing gas flow passage 101, together with a cooling surface sealing member 104, which seals a cooling medium flow passage, aligned in a row in the stacking direction of the fuel cell units 105, the outer dimensions in the stacking direction of the fuel cell stack 106 are minimized.

However, the drawback with the fuel cell stack 106 that is structured in this manner is that if the gas sealing members 102 and 103 that seal the flow passages 100 and 101 as well as the cooling surface sealing member 104 are all placed in a row in the stacking direction of the fuel cell unit 105, then the thickness of the fuel cell stack 106 cannot be made less than a value obtained by adding the height of the cooling surface sealing member 104 to the minimum thickness of each fuel cell unit 105, and multiplying this result by the number of fuel cell units stacked in the fuel cell.

In order to explain this more specifically, the discussion will return to FIG. 36. According to FIG. 36, the fuel gas supply port 107 and the fuel gas flow passage 100 that are isolated in a sealed state by the gas sealing members 102 and 103 and by the cooling surface sealing member 104 are connected by a communication path 108. The communication path 108 is provided in the separator 109 so as to detour around, in the thickness direction of the separator 109, the gas sealing member 102 that seals the entire periphery of the fuel gas flow passage 100. Moreover, the separator 110 also has a similar communication path (not shown) near the oxidizing gas communication port (not shown).

Accordingly, each of the separators 109 and 110 are formed relatively thickly in order to form the communication path 108; however, as is seen in the cross section in FIG. 36, at the position of the seal line where each of the sealing members 102 to 104 are placed, the separators 109 and 110 are formed with the minimum thickness needed to ensure the required strength, and it is not possible to make them any thinner.

Moreover, because each of the sealing members 102 to 104 is formed with the minimum height needed to secure the sealing performance, it is not possible to reduce the height of the sealing members 102 to 104 any further.

As a result, although the thickness of the fuel cell stack 106 is found by multiplying the number of stacks by the sum of the minimum thickness of the two separators 109 and 110, the thickness needed to form the communication path 108, the height of the two gas sealing members 102 and 103, the thickness of the solid polymer electrolyte membrane 111, and the height of the cooling surface sealing member 104, because these are all indispensable, it is extremely difficult to achieve any further reduction in thickness.

The present invention was conceived in view of the above circumstances, and it is an object thereof to provide a fuel cell that has been made lighter and smaller by reducing the thickness thereof in the stacking direction, while reliably sealing the respective flow paths using the respective sealing members between the separators and the electrode assemblies that form the fuel cell.

SUMMARY OF THE INVENTION

In order to solve the above problems, a first aspect of the present invention provides a fuel cell comprising fuel cell units, the fuel cell units being stacked and having at least one cooling medium flow passage therebetween, and the cooling medium flow passage sealed by a cooling surface sealing member, each fuel cell unit comprising: an electrode assembly formed by disposing electrodes on both sides of an electrolyte; a pair of separators that sandwich the electrode assembly in the thickness direction thereof; and gas sealing members that are disposed at an outer peripheral portion of the electrode assembly, and that seal respective reaction gas flow passages that are formed between each separator and the electrode assembly and are bounded by the separators and electrode assembly, wherein in each of the separators there are provided reaction gas communication ports and cooling medium communication ports that are provided outward from the gas sealing members, and reaction gas communication paths that detour around the gas sealing members in the thickness direction of the separators and connect the reaction gas communication ports with the reaction gas flow passages, wherein the reaction gas communication paths formed in one of the fuel cell units and the corresponding reaction gas communication paths formed in the adjacent fuel cell unit in the stacking direction are disposed so as to be offset with respect to each other as viewed in the stacking direction, and wherein in at least one of the separators, there are provided convex portions that protrude from rear sides of the reaction gas communication paths over at least an area that corresponds to the reaction gas communication paths.

According to the fuel cell as constructed above, because the reaction gas communication paths formed in one of the fuel cell units and the corresponding reaction gas communication paths formed in the adjacent fuel cell unit in the stacking direction are disposed so as to be offset with respect to each other as viewed in the stacking direction, the gas sealing members of the adjacent fuel cell unit can be disposed so as to be offset, as viewed in the stacking direction, from a position where the reaction gas communication paths of the above-mentioned one fuel cell unit are formed. As a result, it is not necessary to ensure sufficient space for forming reaction gas communication paths in the adjacent fuel cell unit at a position corresponding to the reaction gas communication paths formed in the above-mentioned one fuel cell unit. Therefore, by providing the convex portions that protrude over at least an area that corresponds to the reaction gas communication paths in the separator of the above-mentioned one fuel cell unit, it is possible to shift the area, where the reaction gas communication paths of the above-mentioned one fuel cell unit are formed, toward the adjacent fuel cell unit in the stacking direction. Accordingly, the thickness of the fuel cell unit at the area where the reaction gas communication paths are formed may be reduced by the amount saved in this way.

In addition, in a case in which a second separator contacts with a first separator having the reaction gas communication paths therein, the above-mentioned convex portion may be formed on the second separator by forming a concave portion therein that accommodates the convex portion formed on the rear side of the reaction gas communication paths in the first separator.

Furthermore, in a case in which a second separator does not contact a first separator having the reaction gas communication paths therein, the above-mentioned convex portion may be formed on the first separator by making the rear side of the reaction gas communication paths to be projected.

Because as many as several hundred fuel cell units may be stacked in a fuel cell, it is possible to achieve a marked size reduction in the fuel cell as a whole in accordance with how many unit cells, each of whose thickness has been reduced, are stacked. Specifically, in a case in which the cooling medium flow passages are provided not for every fuel cell unit but for every group of fuel cell units, the cooling surface sealing members are not necessary between the fuel cell units that are not provided with the cooling medium flow passage. Accordingly, a further reduction in the thickness of the entire fuel cell stack may be desirably achieved.

In a fuel cell according to a second aspect of the present invention, the reaction gas communication paths formed in one of the fuel cell units and the corresponding reaction gas communication paths formed in the adjacent fuel cell unit in the stacking direction may be disposed so as to be offset with respect to each other in the direction from the reaction gas communication ports to the reaction gas flow passages as viewed in the stacking direction.

According to the fuel cell as constructed above, it is not necessary to ensure thickness sufficient to form the reaction gas communication paths in the adjacent fuel cell unit at positions corresponding to the reaction gas communication paths formed in the other fuel cell unit as viewed in the stacking direction. In addition, it is possible to form the reaction gas communication paths in the adjacent fuel cell unit so as to be disposed outward from the electrode assembly of the other fuel cell unit as viewed in the stacking direction. Accordingly, it is possible to dispose the gas sealing member of the adjacent fuel cell unit, as viewed in the stacking direction, so as to be offset from the reaction gas communication paths formed in the other fuel cell unit and so as to be disposed outward from the electrode assembly of the other fuel cell unit. The portions in the other fuel cell unit, corresponding to the reaction gas communication paths formed in the adjacent fuel cell unit as viewed in the stacking direction, open to the reaction gas communication ports. If the dimensions of the above-mentioned portions are sufficient to make the reaction gases flow with respect to the electrode assembly, the portion where the reaction gas communication paths in the adjacent fuel cell unit are formed may be positioned so as to protrude, in the stacking direction, beyond the plane of the electrode assembly of the other fuel cell unit; thus, it is possible to reduce the thickness of the fuel cell stack by the amount saved in this way.

In a fuel cell according to a third aspect of the present invention, the reaction gas communication paths formed in one of the fuel cell units and the corresponding reaction gas communication paths formed in the adjacent fuel cell unit in the stacking direction may be disposed so as to be offset with respect to each other in a direction perpendicular to the direction from the reaction gas communication ports to the reaction gas flow passages as viewed in the stacking direction.

In a fuel cell according to a fourth aspect of the present invention, the reaction gas communication paths formed in one of the fuel cell units and the corresponding reaction gas communication paths formed in the adjacent fuel cell unit in the stacking direction may be disposed so as to be offset with respect to each other in a diagonal direction with respect to the direction from the reaction gas communication ports to the reaction gas flow passages as viewed in the stacking direction.

According to the fuel cell of the above third or fourth aspect, because the reaction gas communication paths formed in one of the fuel cell units and the corresponding reaction gas communication paths formed in the adjacent fuel cell unit in the stacking direction are disposed so as to be offset with respect to each other in a direction intersecting the direction from the reaction gas communication ports to the reaction gas flow passages as viewed in the stacking direction, it is not necessary to ensure thickness sufficient to form the reaction gas communication paths in the adjacent fuel cell unit at positions corresponding to the reaction gas communication paths formed in the other fuel cell unit as viewed in the stacking direction. In addition, in a case in which the reaction gas communication paths formed in one of the fuel cell units and the corresponding reaction gas communication paths formed in the adjacent fuel cell unit in the stacking direction are disposed so as to be further offset with respect to each other in the direction from the reaction gas communication ports to the reaction gas flow passages as viewed in the stacking direction, it is possible to dispose the gas sealing member of the adjacent fuel cell unit, as viewed in the stacking direction, so as to be offset from the reaction gas communication paths formed in the other fuel cell unit and so as to be disposed outward from the electrode assembly of the other fuel cell unit. The portions in the other fuel cell unit, corresponding to the reaction gas communication paths formed in the adjacent fuel cell unit as viewed in the stacking direction, do not open to the reaction gas communication ports. Therefore, if the dimensions of the above-mentioned portions are sufficient to ensure electrical insulation performance thereof, the reaction gas communication paths in the adjacent fuel cell unit may be positioned so as to protrude beyond the plane of the electrode assembly of the other fuel cell unit; thus, it is possible to reduce the thickness of the fuel cell stack by the amount saved in this way. Accordingly, if the dimensions required for ensuring electrical insulation performance are smaller than the dimensions required for ensuring to make the reaction gases to flow with respect to the electrode assembly, it is possible to further reduce the thickness of the fuel cell stack than in the case of the fuel cell stack according to the second aspect of the present invention.

In a fuel cell according to a fifth aspect of the present invention, the cooling surface sealing member that seals the cooling medium flow passage from the reaction gas communication ports may be disposed so as to be offset from the reaction gas communication paths toward the reaction gas communication ports.

According to the fuel cell as constructed above, because the cooling surface sealing member that seals the cooling medium flow passage is disposed so as to be offset from the reaction gas communication paths toward the reaction gas communication ports, the communication paths and the cooling surface sealing member can be disposed so as to be overlapped as viewed in a direction perpendicular to the stacking direction, i.e., can be disposed substantially in the same plane. As a result, the thickness of each of the fuel cell units can be reduced by the amount saved by overlapping.

In a fuel cell according to a sixth aspect of the present invention, the cooling surface sealing member may be disposed at substantially the same position as the gas sealing members, as viewed in the stacking direction, except in the vicinity of the reaction gas communication paths.

According to the fuel cell as constructed above, the gas sealing member and the cooling surface sealing member are not disposed on the same sealing line by disposing the cooling surface sealing member so as to be offset toward the reaction gas communication ports in the vicinity of the reaction gas communication paths where the separator must be thick enough to accommodate the reaction gas communication paths that detour around the gas sealing members in the thickness direction of the separator, whereas in the position other than the vicinity of the reaction gas communication paths, the cooling surface sealing member and the gas sealing member are disposed in a row as viewed in the stacking direction, whereby it is possible to reduce the cross section area of the fuel cell units. Furthermore, by making sealing lines be offset with respect to each other, it is possible to dispose the cooling surface sealing member and the communication paths substantially in the same plane. Accordingly, the thickness of the fuel cell stack can be reduced by disposing the cooling surface sealing member and the gas sealing members close to each other in the stacking direction.

In a fuel cell according to a seventh aspect of the present invention, in at least one of the separators contacting another separator provided with a convex portion that protrudes from rear side of the reaction gas communication path over at least an area that corresponds to the reaction gas communication path, there may be provided a concave portion that accommodates the convex portion.

According to the fuel cell as constructed above, a further reduction in the thickness of the entire fuel cell stack may be desirably achieved.

BRIEF DESCRIPTION OF THE DRAWINGS

FIG. 21 is a longitudinal cross-sectional view, showing the fuel cell stack shown in FIG. 1, taken along the line C—C in FIG. 8.

FIGS. 24A and 25B are longitudinal cross-sectional views showing the second embodiment of the present invention, corresponding to FIGS. 19A and 19B showing the first embodiment.

FIGS. 29A and 29B are longitudinal cross-sectional views showing the fifth embodiment of the present invention, corresponding to FIGS. 20A and 20B showing the first embodiment.

FIGS. 31A and 31B are longitudinal cross-sectional views showing the seventh embodiment of the present invention, corresponding to FIGS. 19A and 19B showing the first embodiment.

DETAILED DESCRIPTION OF THE PREFERRED EMBODIMENTS

The fuel cell stack 1 according to the first embodiment of the present invention will now be described in detail with reference to the drawings.

Figure 1:
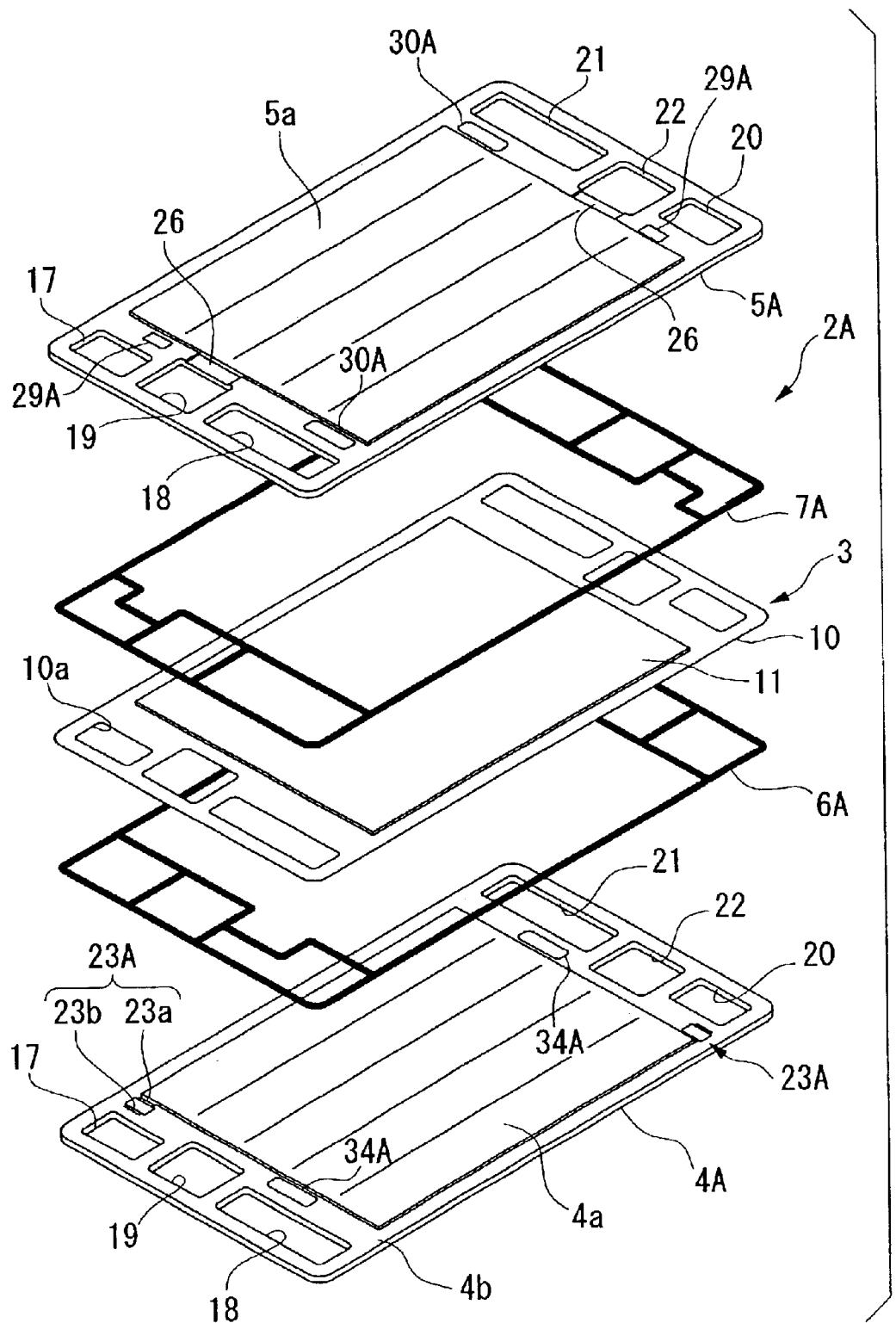
FIG. 1 is a schematic diagram showing a fuel cell unit forming the fuel cell stack according to a first embodiment of the present invention.
Figure 2:
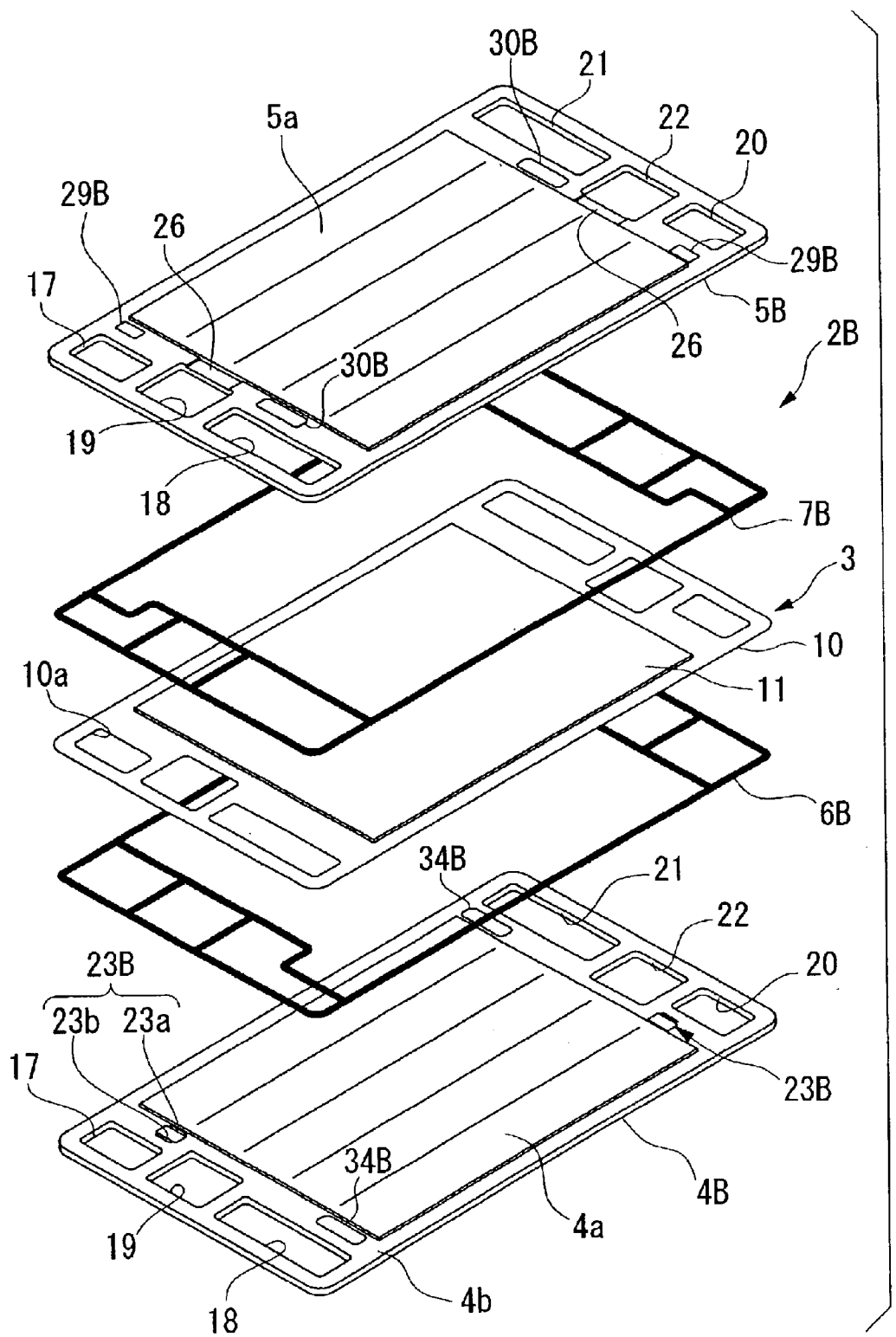
FIG. 2 is also a schematic diagram showing the fuel cell unit forming the fuel cell stack according to the first embodiment of the present invention.

The fuel cell stack 1 according to the present embodiment is formed by alternatingly stacking a plurality of fuel cell units 2A and 2B respectively shown in FIGS. 1 and 2. In the following description, explanations for the structures of the fuel cell unit 2B which are common to the fuel cell unit 2A will be omitted as long as appropriate. As shown in FIG. 1, a fuel cell unit 2A is formed by sandwiching an electrode assembly 3 between a pair of separators 4A (anode side) and 5A (cathode side). As shown in FIG. 2, a fuel cell unit 2B is formed by sandwiching an electrode assembly 3 between a pair of separators 4B (anode side) and 5B (cathode side). Between the electrode assembly 3 and each of the separators 4A and 5A are disposed respectively gas sealing members 6A and 7A. Moreover, between the electrode assembly 3 and each of the separators 4B and 5B are disposed respectively gas sealing members 6B and 7B. As will be explained in detail below, these gas sealing members 6 (6A and 6B) and 7 (7A and 7B) delimit a fuel gas flow passage 8 and an oxidizing gas flow passage 9 so as to seal them on either side of the electrode assembly 3.

Figure 3:
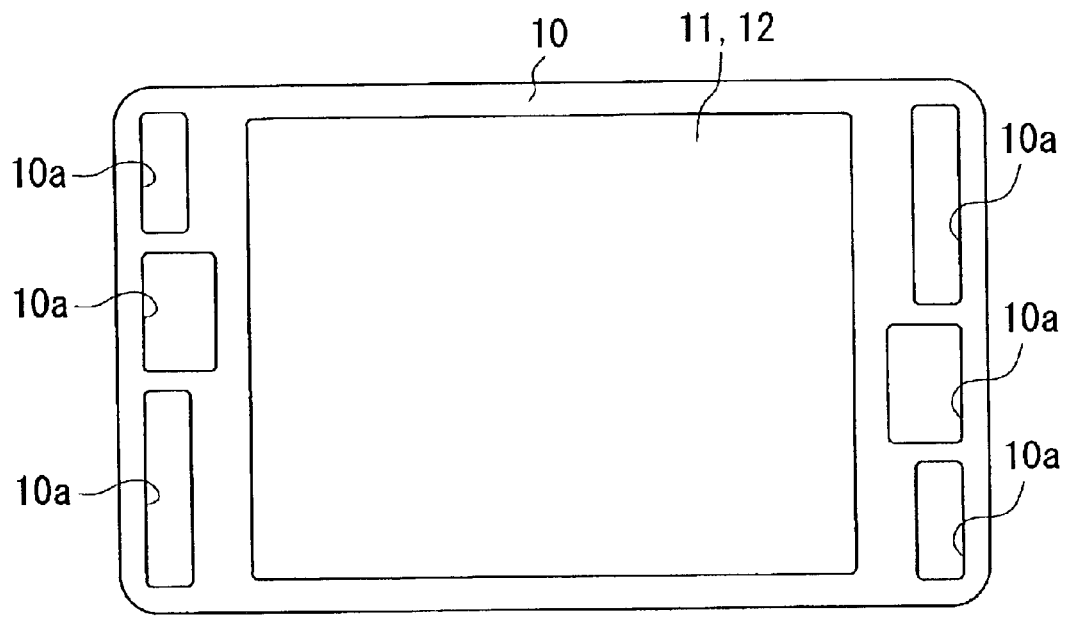
FIG. 3 is a plan view showing an electrode assembly forming the fuel cell unit shown in FIGS. 1 and 2.

As shown in FIG. 3, the electrode assembly 3 has, for example, a solid polymer electrolyte membrane 10 (referred to below simply as an electrolyte membrane) formed from a perfluorosulfonate polymer, and an anode electrode 11 and cathode electrode 12 that sandwich two surfaces of the electrolyte membrane 10.

As shown in FIG. 3, for example, the electrolyte membrane 10 has a plurality of through holes 10a. The electrolyte membrane 10 is the equivalent size to the separators 4 (4A and 4B) and 5 (5A and 5B), and each of the through holes 10a is placed at a position that corresponds to the respective supply ports 17 to 19 and the respective discharge ports 20 to 22 of the separators 4 and 5.

The anode electrode 11 and the cathode electrode 12 are constructed, for example, by stacking catalyst layers, formed from an alloy having Pt (platinum) as the main constituent, on a surface of a gas diffusion layer formed from porous carbon cloth or porous carbon paper that is contact with the electrolyte membrane 10.

Each of the separators 4 and 5 that form the fuel cell units 2A and 2B is formed from: corrugated portions 4a or 5a made up of a plurality of indentations and bumps that have a fixed height and are formed in a fixed pattern by scraping out a plurality of grooves 13 to 15 (see FIG. 22) in a surface of a flat plate made from carbon; a fuel gas supply port (reaction gas communication port) 17, an oxidizing gas supply port (reaction gas communication port) 18, a cooling medium supply port (cooling medium communication port) 19, a fuel gas discharge port (reaction gas communication port) 20, an oxidizing gas discharge port (reaction gas communication port) 21, and a cooling medium discharge port (cooling medium communication port) 22 that each penetrate the separators 4 and 5 so as to make possible both the supply and discharge of fuel gas (for example, hydrogen gas), oxidizing gas (for example, air that contains oxygen), and a cooling medium (for example, pure water) respectively that are made to flow through the corrugated portions 4a or 5a; and planar portions 4b or 5b that is disposed so as to surround each of the supply ports 17 to 19, the discharge ports 20 to 22, and the corrugated portions 4a or 5a. The separator 4A and 5A out of the separators 4 and 5 will now be explained below with reference to FIGS. 4 and 5.

The cooling medium supply port 19 is located in the left end of the separators 4A and 5A and substantially in the center in the transverse direction of the separators 4A and 5A (i.e., the direction indicated by the arrow I). In the left end of the separators 4A and 5A, the fuel gas supply port 17 is located at one side and the oxidizing gas supply port 18 is located at the other side in the transverse direction of the separators 4A and 5A sandwiching the cooling medium supply port 19.

The cooling medium discharge port 22 is located in the right end of the separators 4A and 5A and substantially in the center in the transverse direction of the separators 4A and 5A. In the right end of the separators 4A and 5A, the fuel gas discharge port 20 is located at one side and the oxidizing gas discharge port 21 is located at the other side in the transverse direction of the separators 4A and 5A sandwiching the cooling medium discharge port 22.

The fuel gas discharge port 20 and the oxidizing gas discharge port 21 are located at diagonally opposite positions respectively to the fuel gas supply port 17 and the oxidizing gas supply port 18.

The lengths (as indicated by the arrow K) of the fuel gas supply port 17 and discharge port 20 and the lengths (as indicated by the arrow K) of the oxidizing gas supply port 18 and discharge port 21 in the longitudinal directions of the separators 4A and 5A (the direction indicated by the arrow J) are made to be shorter than the lengths (as indicated by the arrow L) of the adjacent cooling medium supply port 19 and discharge port 22.

As a result, the size of the space (as indicated by the arrow M) from the fuel gas supply port 17 and discharge port 20 and from the oxidizing gas supply port 18 and discharge port 21 to the corrugated portions 4a and 5a is made larger than the size of the space (as indicated by the arrow N) from the cooling medium supply port 19 and discharge port 22 to the corrugated portions 4a and 5a.

Figure 4:
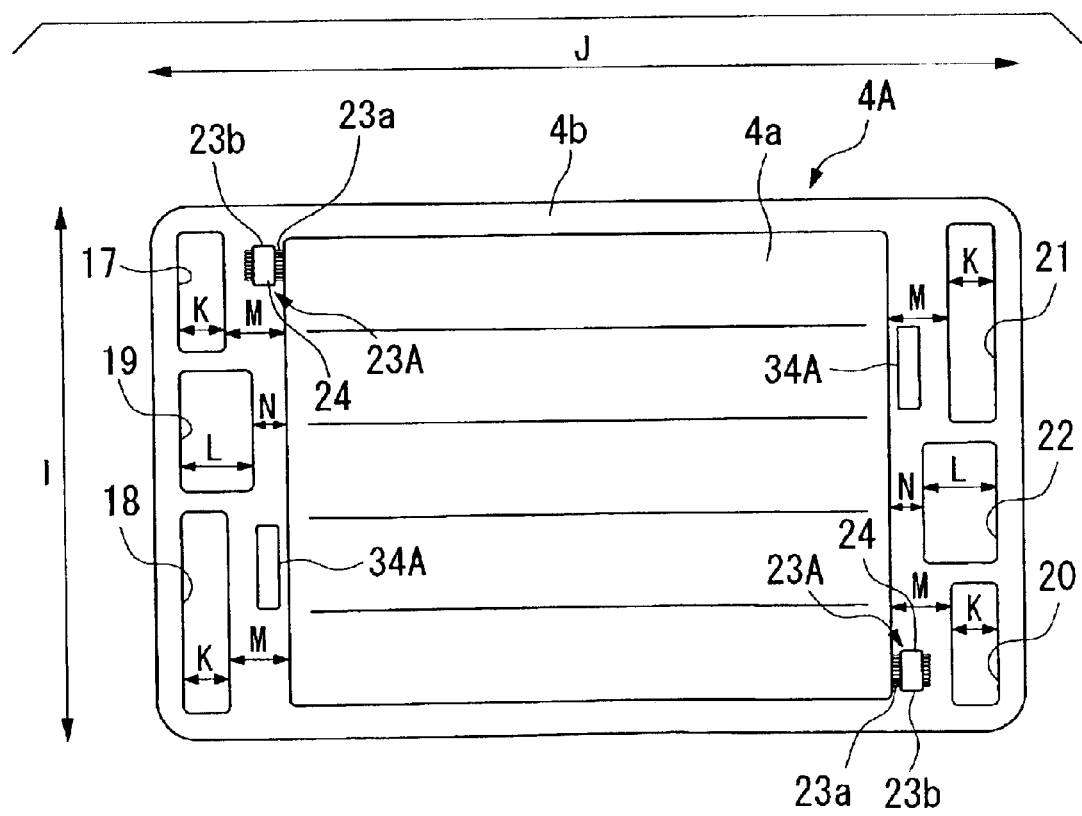
FIG. 4 is a plan view showing one separator forming the fuel cell unit shown in FIG. 1.

As shown in FIG. 4, between the fuel gas supply port 17 and the corrugated portion 4a and between the corrugated portion 4a and the fuel gas discharge port 20 on one surface, facing the anode, of the separator 4A are formed fuel gas communication paths 23A that respectively allow fuel gas supplied from the fuel gas supply port 17 to pass to the corrugated portion 4a, and fuel gas that has passed through the corrugated portion 4a to be discharged from the fuel gas discharge port 20. The fuel gas communication paths 23A are provided with a plurality of grooves 23a formed on one surface, facing the anode, of a separator 4A and a flat bridge plate 23b that extends right across the grooves 23a. On the surface of the separator 4A where the bridge plate 23b is placed is formed a recess 24 into which the bridge plate 23b is fitted. This recess 24 enables the surface of the bridge plate 23b to be placed within the same planar surface as the surface 4b of the separator 4A.

Moreover, in the separator 4A, there are provided convex portions 34A between the oxidizing gas supply port 18 and the corrugated portions 4a and toward the center of the separator 4A as viewed in the direction indicated by the arrow I, and between the corrugated portions 4a and the oxidizing gas discharge port 21 and toward the center of the separator 4A as viewed in the direction indicated by the arrow I, respectively. These convex portions 34A will be further explained below.

Figure 5:
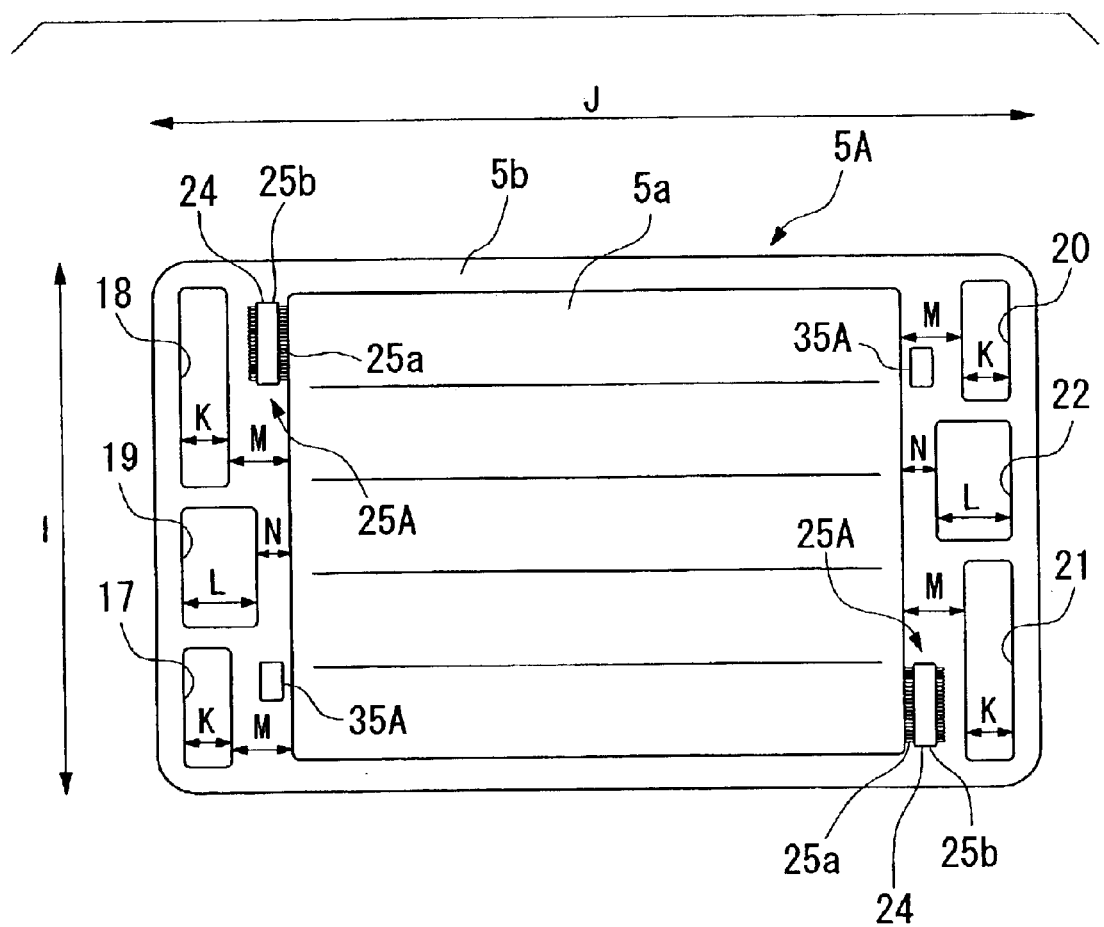
FIG. 5 is a plan view showing another separator forming the fuel cell unit shown in FIG. 1.

As shown in FIG. 5, in a manner similar to the separator 4A, between the oxidizing gas supply port 18 and the corrugated portion 4a and between the corrugated portion 4a and the oxidizing gas discharge port 21 on one surface, facing the cathode, of the separator 5A are formed oxidizing gas communication paths 25A that respectively allow fuel gas supplied from the oxidizing gas supply port 17 to pass to the corrugated portion 5a, and oxidizing gas that has passed through the corrugated portion 5a to be discharged from the oxidizing gas discharge port 21. The oxidizing gas communication paths 25A are provided with a plurality of grooves 25a formed on one surface, facing the anode, of a separator 5A and a flat bridge plate 25b that extends right across the grooves 25a. On the surface of the separator 5A where the bridge plate 25b is placed is formed a recess 24 into which the bridge plate 25b is fitted. This recess 24 enables the surface of the bridge plate 25b to be placed within the same planar surface as the surface 5b of the separator 5A.

Moreover, in the separator 5A, there are provided convex portions 35A between the fuel gas supply port 17 and the corrugated portions 5a and toward the center of the separator 5A as viewed in the direction indicated by the arrow I, and between the corrugated portions 5a and the fuel gas discharge port 20 and toward the center of the separator 5A as viewed in the direction indicated by the arrow I, respectively. These convex portions 35A will be further explained below.

Figure 6A:
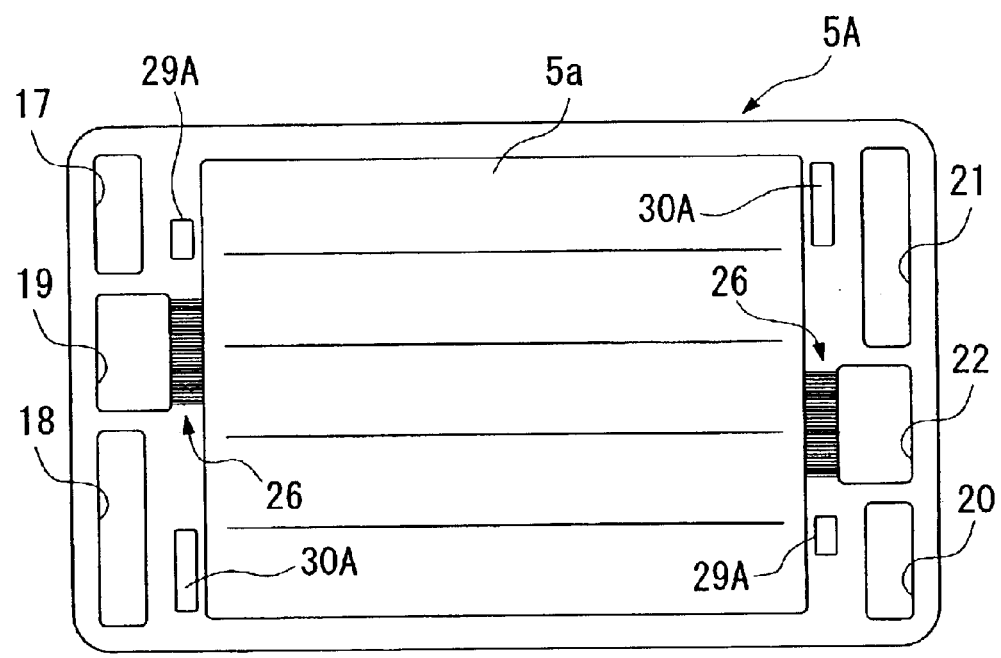
FIG. 6A is a plan view showing the rear surface of the separator shown in FIG. 5.
Figure 6B:
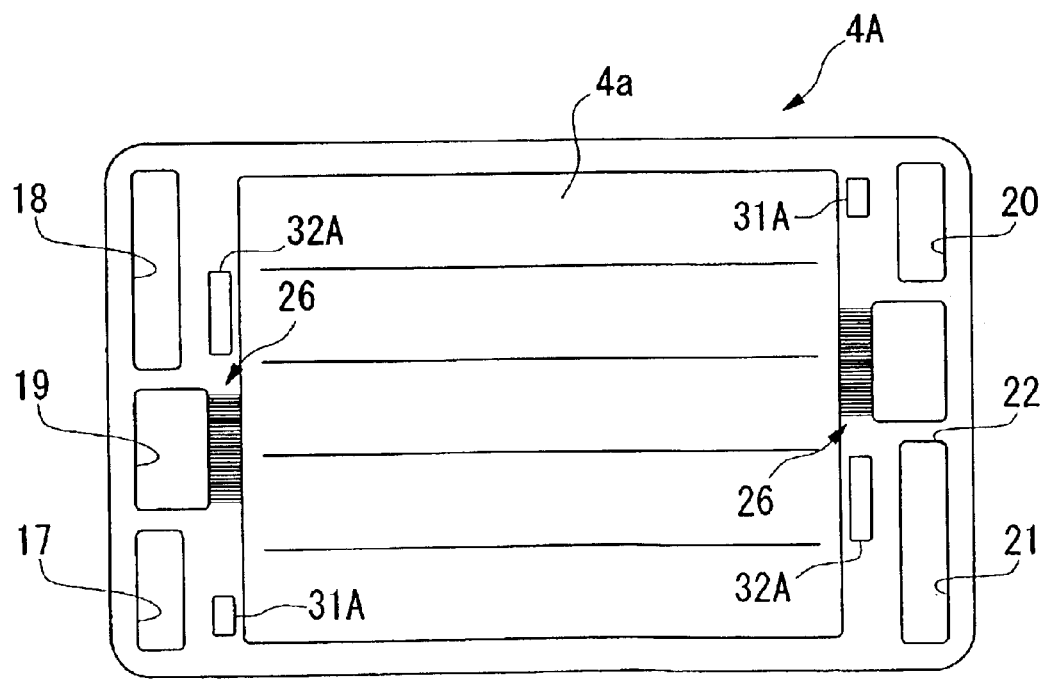
FIG. 6B is a plan view showing the rear surface of the separator shown in FIG. 4.

As shown in FIGS. 6A and 6B, on the other surfaces, i.e., the cooling surfaces, of the two separators 4A and 5A are provided a cooling medium communication path 26 that connects the cooling medium supply port 19 to the corrugated portions 4a and 5a, and a cooling medium communication path 26 that connects the corrugated portions 4a and 5a to the cooling medium discharge port 22.

Moreover, as shown in FIG. 6A, in the separator 5A, convex portions 30A are provided on the rear surface thereof at positions corresponding to the oxidizing gas communication paths 25A, and concave portions 29A are provided on the rear surface at the position corresponding to the convex portions 35A.

As shown in FIG. 6B, in the separator 4A, convex portions 31A are provided on the rear surface at the position corresponding to the fuel gas communication paths 23A, and concave portions 32A are provided on the rear surface at the position corresponding to the convex portions 34A. The convex portions 30A and 31A, and the concave portions 29A and 32A will be further explained below.

Figure 7:
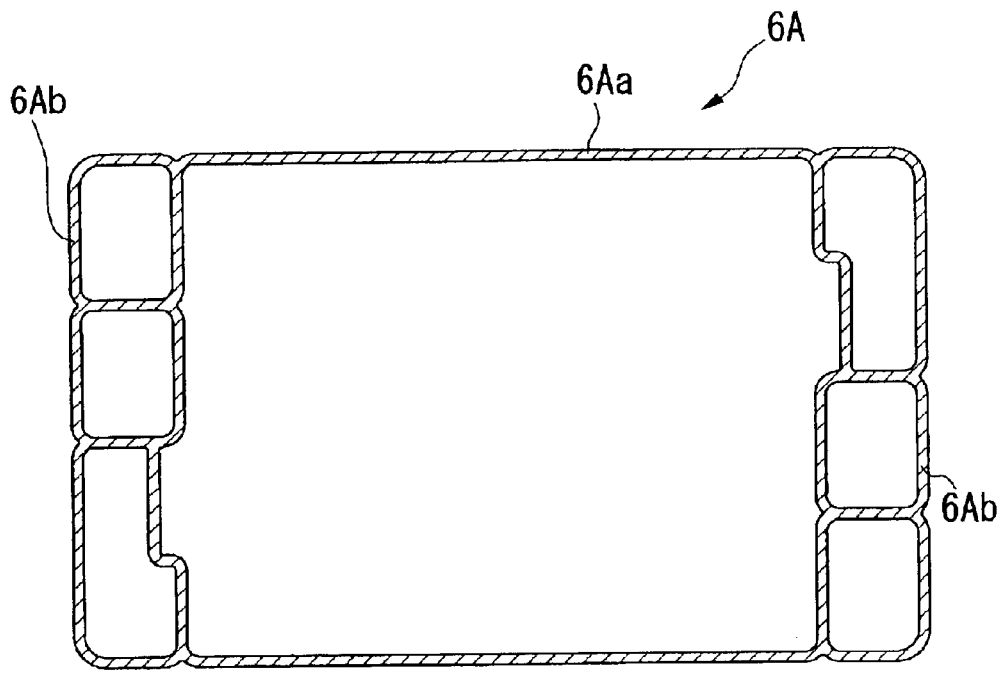
FIG. 7 is a plan view showing a gas sealing member forming the fuel cell unit shown in FIG. 1.

As shown in FIG. 7, the gas sealing member 6A is integrally formed such that a plurality of sub-loop portions 6Ab that encircle each of the supply ports 17 to 19 and discharge ports 20 to 22 are disposed on both sides of main-loop portion 6Aa that encircles the outer peripheries of the corrugated portions 4a and 5a. In a manner similar to the gas sealing member 6A, the gas sealing member 7A also has a main-loop portion 7Aa and sub-loop portions 7Ab. Furthermore, in a manner similar to the gas sealing member 6A, the gas sealing members 6B and 7B have main-loop portions 6Ba and 7Ba, and sub-loop portions 6Bb and 7Bb, respectively.

Figure 8:
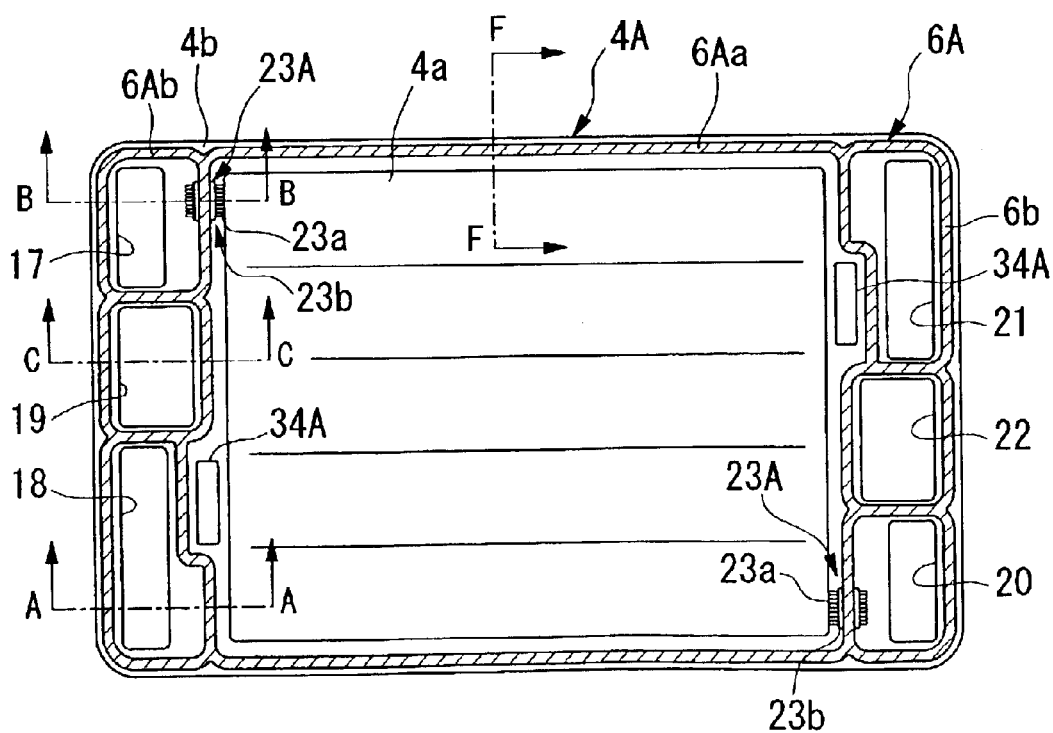
FIG. 8 is a plan view showing a fuel cell unit forming the fuel cell stack according to the first or second embodiment of the present invention.
Figure 10:
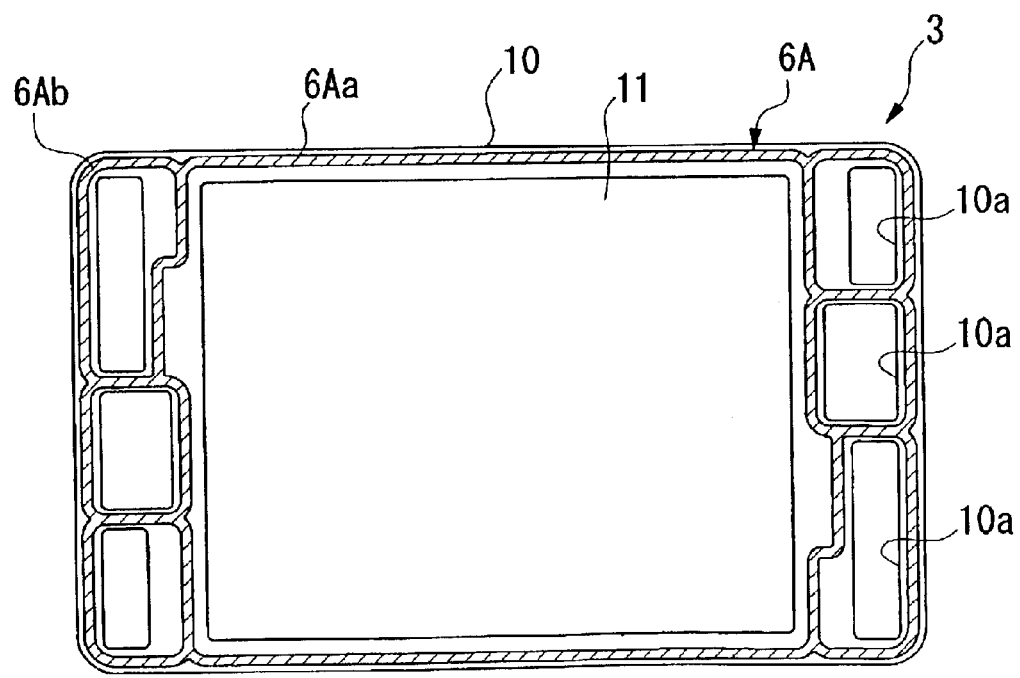
FIG. 10 is a plan view showing a state in which the gas sealing member shown in FIG. 9 is provided on the electrode assembly shown in FIG. 3.
Figure 11:
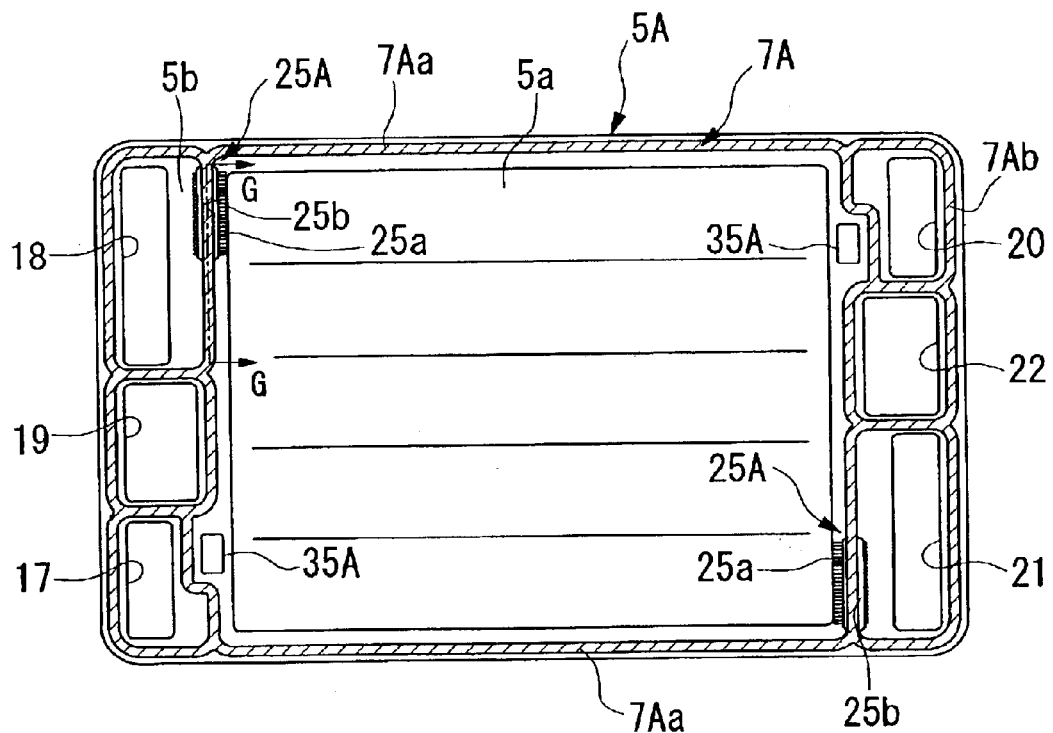
FIG. 11 is a plan view showing the fuel cell unit forming the fuel cell stack according to the first or second embodiment of the present invention.

FIGS. 8, 10, and 11 each show a state in which the sealing member 6A is placed on the anode side surface of the one separator 4A, on the anode side surface of the electrode assembly 3, and on the cathode side surface of the separator 5A.

As shown in FIGS. 8, 10, and 11, the main-loop portions 6Aa and 7Aa of the gas sealing members 6A and 7A are positioned so as to run along the planar portions 4b and 5b between the respective supply ports 17 to 19 and the corrugated portions 4a and 5a, and between the respective discharge ports 20 to 22 and the corrugated portions 4a and 5a. As a result, the main-loop portions 6Aa and 7Aa pass over the top of the bridge plates 23b and 25b provided on the communication paths 23A and 25A, and the respective supply ports 17 to 19 and discharge ports 20 to 22 are only connected with the corrugated portions 4a and 5a by the grooves 23a and 25a forming the communication paths 23A and 25A. The remaining portions are sealed in a fluid tight state. Moreover, as shown in FIGS. 8 and 10, the gas sealing members 6A and 7A run so as to detour around the convex portions 34A and 35A that are formed in the separators 4A and 5A, respectively.

Figure 9:
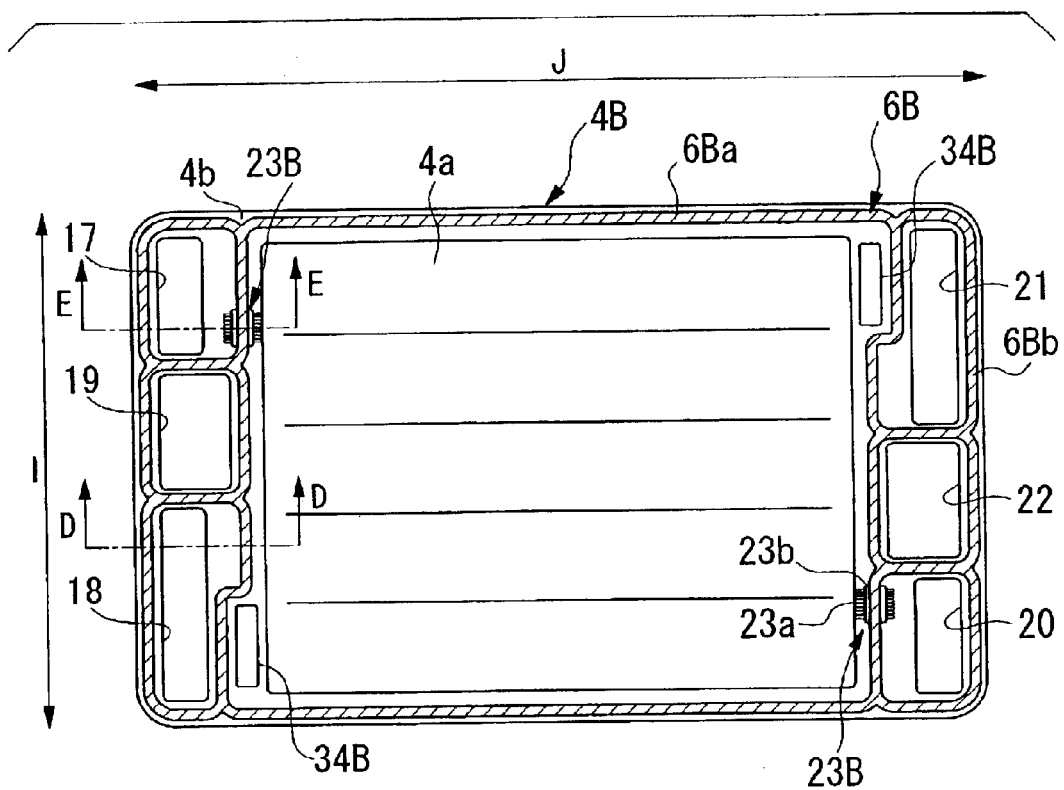
FIG. 9 is also a plan view showing the fuel cell unit forming the fuel cell stack according to the first or second embodiment of the present invention.

The fuel cell unit 2B will be explained below. As shown in FIG. 9, as in the case of the fuel cell unit 2A, in the separator 4B of the fuel cell unit 2B, there are provided fuel gas communication paths 23B that connect the fuel gas supply port 17 and fuel gas discharge port 20 to the corrugated portion 4a. The communication paths 23B are located so as to be offset from the communication paths 23A in the direction indicated by the arrow I (i.e., a direction perpendicular to the direction from the fuel gas supply port 17 to the fuel gas flow passage 8) as viewed in the stacking direction. Moreover, in the separator 4B, there are provided convex portions 34B between the oxidizing gas supply port 18 and the corrugated portions 4a and toward the periphery of the separator 4B as viewed in the direction indicated by the arrow I, and between the corrugated portions 4a and the oxidizing gas discharge port 21 and toward the center of the periphery of the separator 4B as viewed in the direction indicated by the arrow I, respectively. The convex portions 34B are located so as to be offset from the convex portions 34A in the direction indicated by the arrow I as viewed in the stacking direction.

In the separator 4B, there are provided concave portions 32B on the rear surface thereof at positions corresponding to the convex portions 34B. The concave portions 32B are located at positions corresponding to the convex portions 30A formed on the separator 5A as viewed in the stacking direction, and the concave portions 32B are formed so as to accommodate the convex portions 30A. In addition, concave portions 32A formed in the separator 4A are located on the rear surface thereof at positions corresponding to the convex portions 30B so as to accommodate the convex portions 30B formed on the separator 5B.

Figure 12:
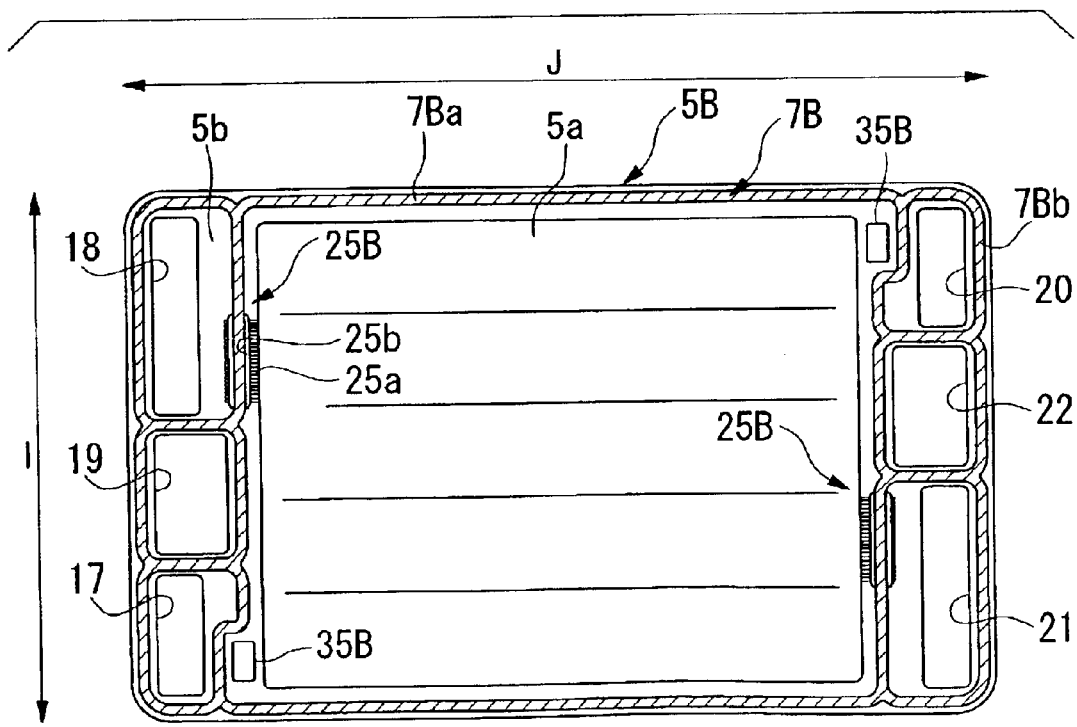
FIG. 12 is also a plan view showing the fuel cell unit forming the fuel cell stack according to the first or second embodiment of the present invention.

As shown in FIG. 12, in the separator 5B of the fuel cell unit 2B, there are provided oxidizing gas communication paths 25B. The oxidizing gas communication paths 25B are located so as to be offset from the oxidizing gas communication paths 25A in the direction indicated by the arrow I (i.e., in a direction perpendicular to the direction from the oxidizing gas supply port 18 to the oxidizing gas flow passage 9) as viewed in the stacking direction. Moreover, in the separator 5B, there are provided convex portions 35B between the fuel gas supply port 17 and the corrugated portions 5a and toward the periphery of the separator 5B as viewed in the direction indicated by the arrow I, and between the corrugated portions 5a and the fuel gas discharge port 20 and toward the center of the periphery of the separator 5B as viewed in the direction indicated by the arrow I, respectively.

In the separator 5B, there are provided concave portions 29B on the rear surface thereof at positions corresponding to the convex portions 35B. The concave portions 29B are located at positions corresponding to the convex portions 31A formed on the separator 4A as viewed in the stacking direction, and the concave portions 29B are formed so as to accommodate the convex portions 31A. In addition, concave portions 29A formed in the separator 5A are formed so as to accommodate the convex portions 31A formed on the separator 4B.

Moreover, the gas sealing members 6B and 7B of the fuel cell unit 2B run so as to detour around the convex portions 34B and 35B that are formed in the separators 4B and 5B, respectively.

Figure 13:
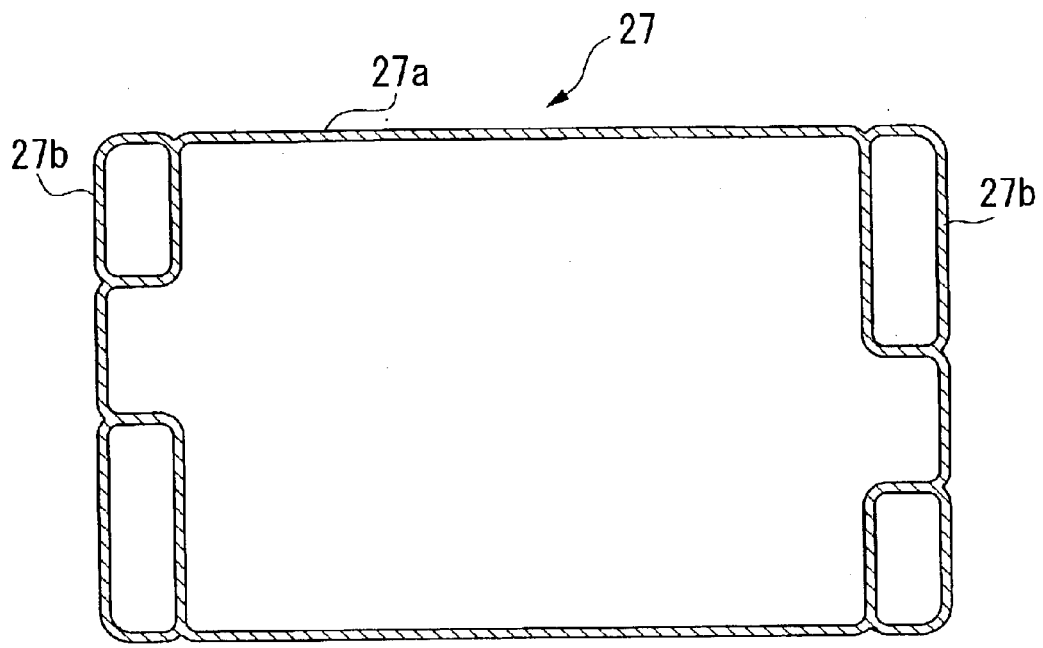
FIG. 13 is a plan view showing a cooling surface sealing member forming the fuel cell unit shown in FIG. 1.
Figure 19A:
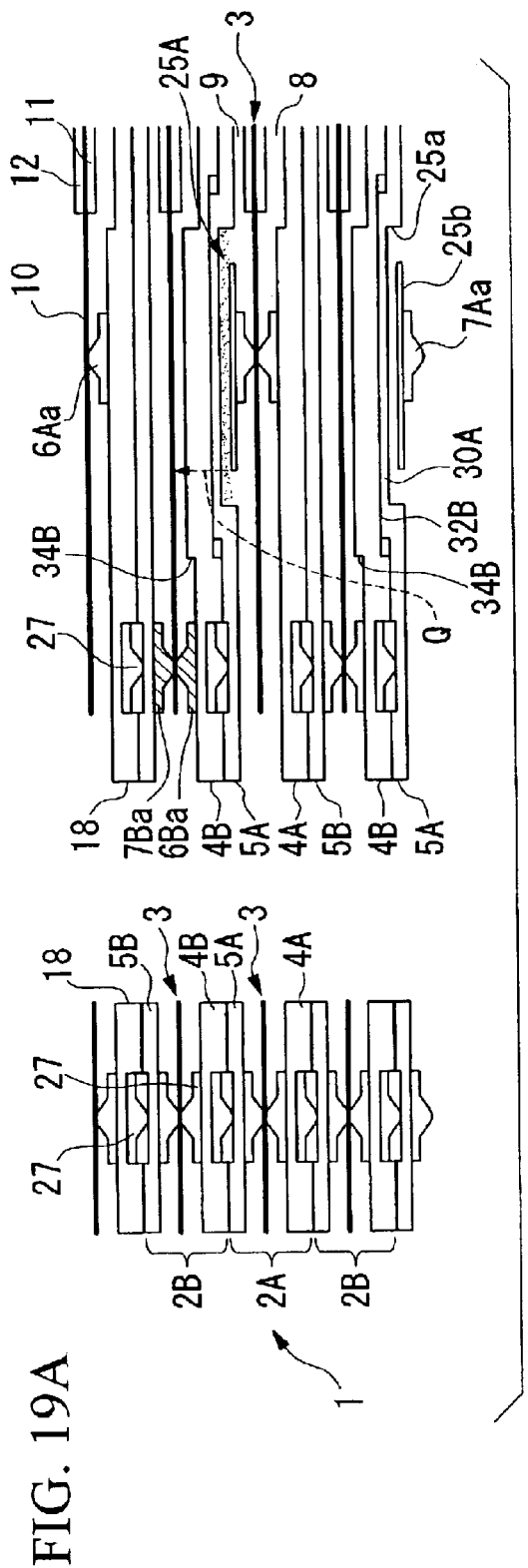
FIG. 19A is a longitudinal cross-sectional view, showing the fuel cell unit according to the first embodiment, taken along the line A—A in FIG. 8.
Figure 19B:
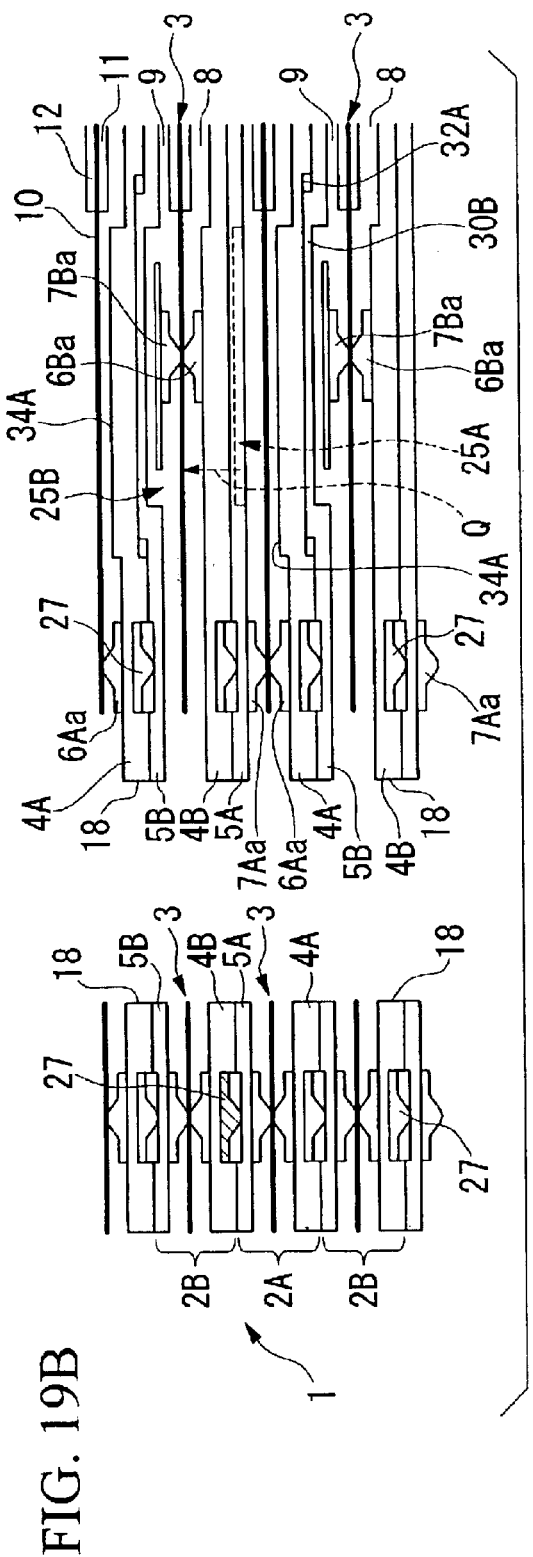
FIG. 19B is a longitudinal cross-sectional view taken along the line D—D in FIG. 9.

As shown in FIGS. 19A and 19B, a plurality of fuel cell units 2A and 2B that are formed in this manner are stacked with cooling surface sealing members 27 interposed between the fuel cell unit 2A and 2B. In other words, between the fuel cell units 2A and 2B respectively shown in FIGS. 1 and 2, there is provided the cooling surface sealing member 27. As shown in FIG. 13, each cooling surface sealing member 27 has a structure in which a main-loop portion 27a is joined integrally to sub-loop portions 27b.

Figure 14:
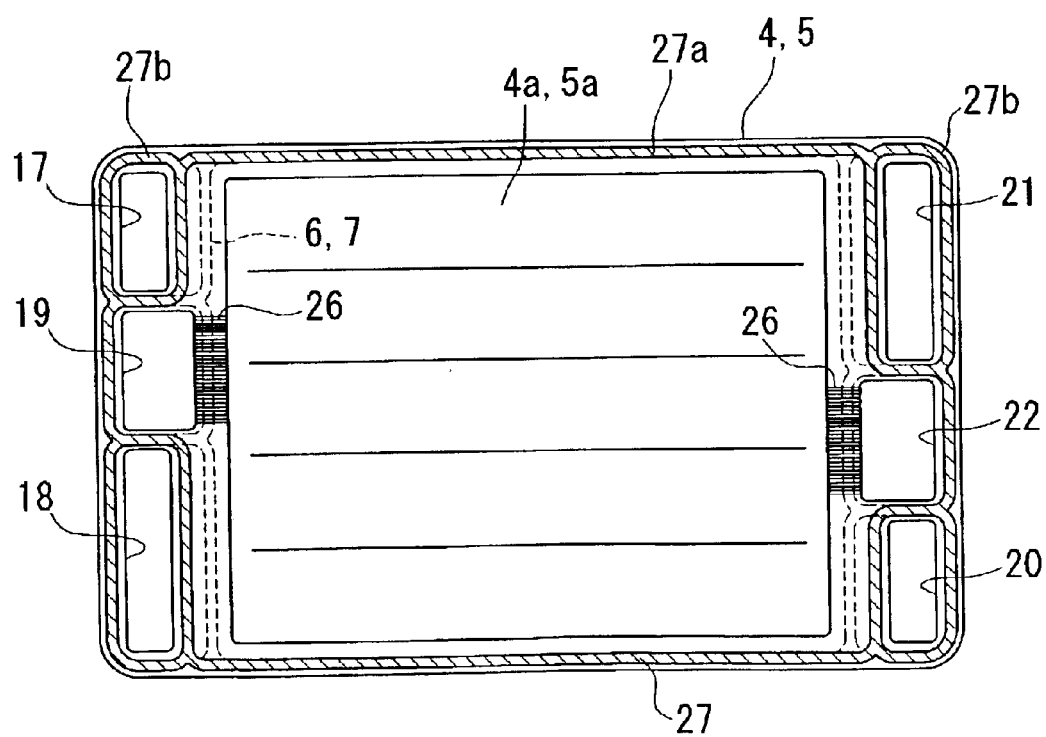
FIG. 14 is a plan view showing a state in which the cooling surface sealing member shown in FIG. 13 is provided on the separator shown in FIG. 6A or 6B.
Figure 15A:
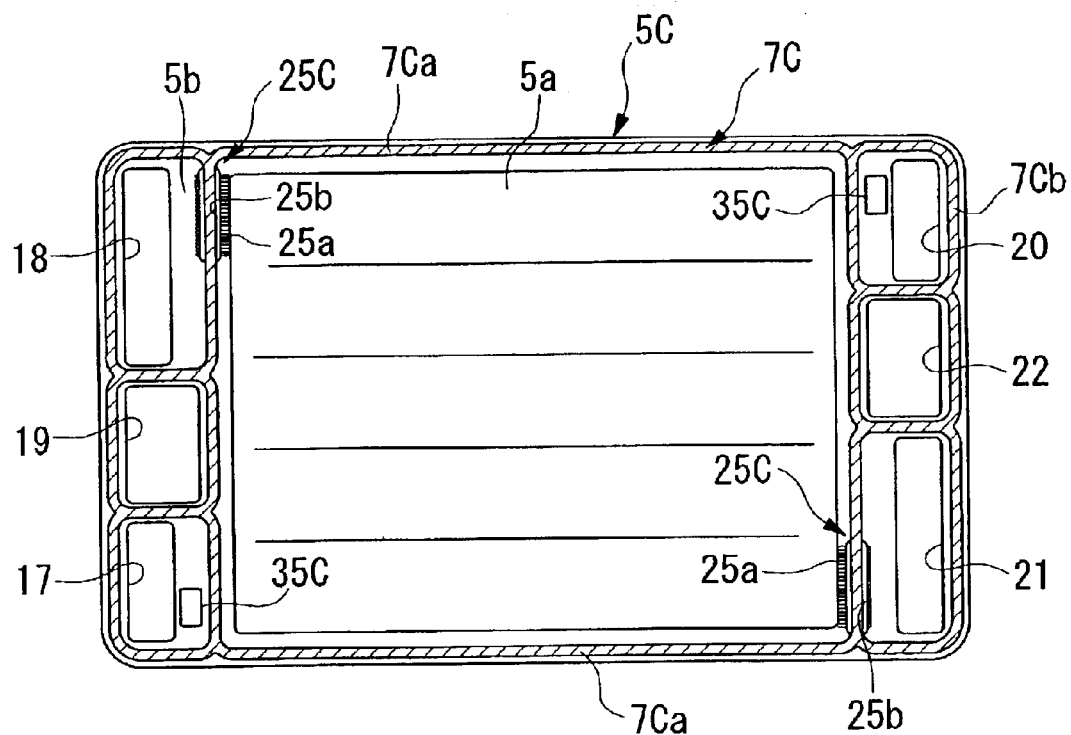
FIGS. 15A and 15B are plan views showing a fuel cell unit forming the fuel cell stack according to third and fourth embodiments of the present invention.
Figure 15B:
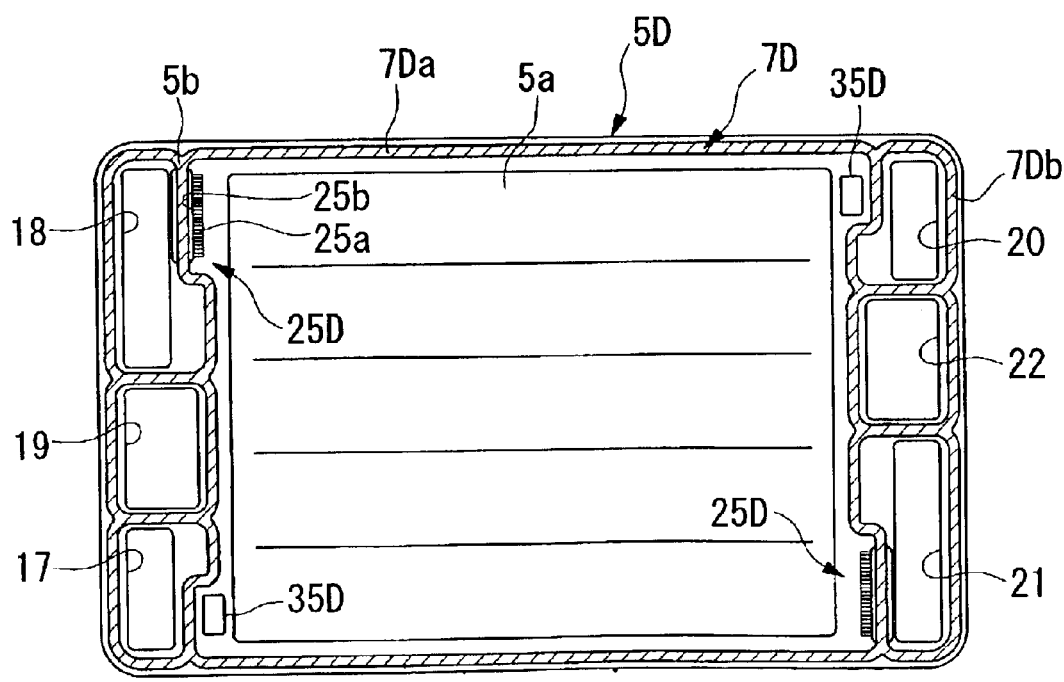

A state in which such a cooling surface sealing member 27 is placed on the other surface sides of each of the separators 4 (4A and 4B) and 5 (5A and 5B) is shown in FIG. 14.

As shown in FIG. 14, the main-loop portion 27a of the cooling surface sealing member 27 runs between the supply ports 17 and 18 of the fuel gas and oxidizing gas and the corrugated portions 4a or 5a, and also between the discharge ports 20 and 21 and the corrugated portions 4a and 5a, and seals the periphery of the cooling medium flow passage 28 (see FIG. 21) that is formed by connecting the cooling medium supply port 19 to the corrugated portions 4a and 5a via the communication path 26, and by connecting the corrugated portions 4a and 5a to the cooling medium discharge port 22 via the communication path 26. Moreover, the sub-loop portions 27b of the cooling surface sealing portion 27 independently seal each of the fuel gas and oxidizing gas supply ports 17 and 18 and discharge ports 20 and 21. Note that the convex portions 30A, 30B, 31A, and 31B and concave portion 29A, 29B, 32A, and 32B that will be described in detail below (see FIGS. 6A and 6B) are omitted from FIG. 14 for reasons of clarity.

If the portions of the main-loop portion 27a of the cooling surface sealing member 27 that run between the supply ports 17 and 18 of the fuel gas and oxidizing gas and the corrugated portions 4a or 5a, and also between the discharge ports 20 and 21 and the corrugated portions 4a or 5a are compared with the positions where the main-loop portions 6a (6Aa and 6Ba) and 7a (7Aa and 7Ba) of the above described gas sealing member run along (as shown by the broken line), then it can be seen that these portions of the main-loop portion 27a are placed at different positions from the main-loop portions 6a and 7a so as to run past positions closer to the supply ports 17 and 18 or to the discharge ports 20 and 21.

Figure 22:
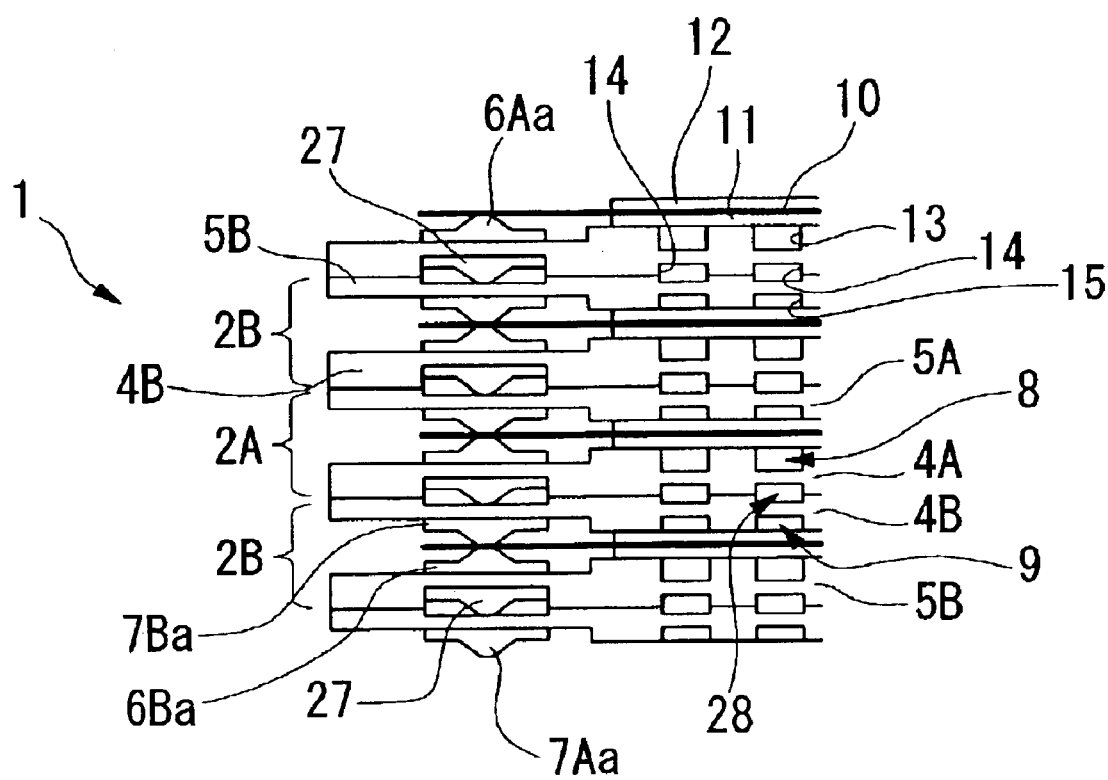
FIG. 22 is a longitudinal cross-sectional view, showing the fuel cell stack shown in FIG. 1, taken along the line F—F in FIG. 8.
Figure 23:
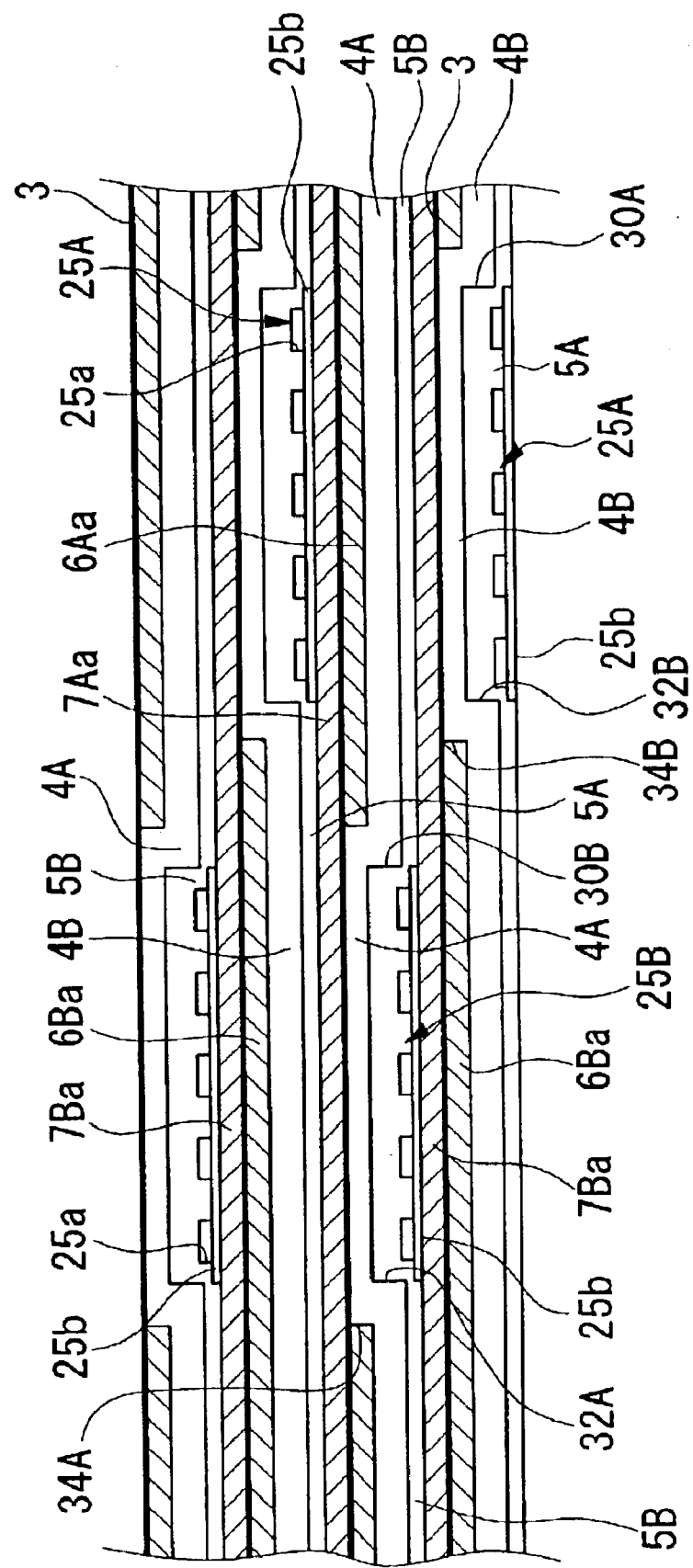
FIG. 23 is a longitudinal cross-sectional view, showing the fuel cell stack shown in FIG. 1, taken along the line G—G in FIG. 11.

Cross sections of respective portions of a fuel cell stack 1 that is constructed in this manner are shown in FIGS. 19A and 19B. FIGS. 19A and 19B are longitudinal cross-sectional views with the cross sections taken along the line A—A in FIG. 8 and taken along the line D—D in FIG. 9, respectively. In FIGS. 19A and 19B, there is shown a flow passage that allow the oxidizing gas to flow from the oxidizing gas supply port 18 that penetrates each of the separators 4 (4A and 4B) and 5 (5A and 5B) in the thickness direction thereof via the oxidizing gas communication path 25 (25A and 25B) to the oxidizing gas flow passage 9 that is formed between the cathode electrode 12 and the separator 5. FIG. 22 is a longitudinal cross-sectional view of the fuel cell stack shown in FIG. 1, taken along the line F—F in FIG. 8. FIG. 23 is a longitudinal cross-sectional view of the fuel cell stack shown in FIG. 1, taken along the line G—G in FIG. 11. In the following description, the elements that are commonly used in the fuel cell unit will be explained with common reference symbols without appending suffixes (A or B).

As shown in FIGS. 19A and 19B, the gas sealing members 6 and 7 that seal the area between the electrode assembly 3 and the pair of separators 4 and 5 placed on either side thereof are placed sandwiching the electrolyte membrane 10 in the thickness direction thereof at positions opposing each other in the stacking direction of the fuel cell unit 2. The main-loop portion 7a of the gas sealing member 7 for the oxidizing gas flow passage 9 is placed on a bridge plate 25b that extends right across the oxidizing gas communication path 25 formed in the separator 5. In other words, the oxidizing gas communication path 25 detours around the main-loop portion 7a of the gas sealing member 7 in the thickness direction of the separator 5, and connects the interior of the main-loop portion 7a of the gas sealing member 7 with the exterior thereof so as to allow the oxidizing gas that is supplied from the oxidizing gas supply port 18 on the exterior side of the main-loop portion 7a of the gas sealing member 7 to flow into the oxidizing gas passage 9 on the interior side of the main-loop portion 7a of the gas sealing member 7.

In this case, the cooling surface sealing member 27 that seals off each fuel cell unit 2 and delimits the cooling medium flow passage 28 is placed so as to be offset from the oxidizing gas communication path 25 where the gas sealing member 7 is provided toward the oxidizing gas supply port 18. As a result, the cooling surface sealing member 27 can be placed substantially in the same plane as the grooves 25a forming the oxidizing gas communication path 25 that are made by carving out one surface of the separator 5 in the thickness direction thereof.

As shown in FIGS. 11 and 12, the oxidizing gas communication paths 25A of the fuel cell unit 2A and the oxidizing gas communication paths 25B of the fuel cell unit 2B are located so as to be offset with respect to each other in a direction perpendicular to the direction from the oxidizing gas supply port 18 to the electrode assembly 3 (the oxidizing gas flow passage 9) as viewed in the stacking direction. As a result, as shown in FIG. 19A, the gas sealing members 6Ba and 7Ba of the fuel cell unit 2B can be provided so as to be offset, as viewed in the stacking direction, from the positions where the oxidizing gas communication paths 25A of the fuel cell unit 2A are formed. Moreover, as shown in FIG. 19B, the gas sealing members 6Aa and 7Aa of the fuel cell unit 2A can be provided so as to be offset, as viewed in the stacking direction, from the positions where the oxidizing gas communication paths 25B of the fuel cell unit 2B are formed.

As shown in FIGS. 19A, in the one separator 5A, there are provided the convex portions 30A that protrude from the rear surface of the separator 5A over an area that corresponds to the oxidizing gas communication paths 25A. As a result, the oxidizing gas communication paths 25A that are formed behind the convex portions 30A have sufficient dimensions that are required for allowing the oxidizing gas to flow. In a manner similar to the separator 5A, in the separator 5B, there are provided the convex portions 30B so that the oxidizing gas communication paths 25B have sufficient dimensions that are required for allowing the oxidizing gas to flow.

Moreover, in the other separator 4B that contacts with the separator 5A, there are provided concave portions 32B that accommodate the above-mentioned convex portions 30A, and the convex portions 30A are received in the concave portions 32B. In the other separator 4A that contacts with the separator 5B, there are provided concave portions 32A that accommodate the above-mentioned convex portions 30B, and the convex portions 30B are received in the concave portions 32A. Note that the plane area of the concave portions 32 are formed larger than that of the convex portions 30 so as to facilitate positioning of the convex portions 30 into the concave portions 32.

Furthermore, in the separator 4B, convex portions 34B are formed by projecting the rear surface of the concave portions 32B so that the convex portions 34B and the gas sealing member 6Ba are overlaid as viewed in a direction perpendicular to the stacking direction. In addition, in the separator 4A, convex portions 34A are formed by projecting the rear surface of the concave portions 32A so that the convex portions 34A and the gas sealing member 6Aa are overlaid as viewed in a direction perpendicular to the stacking direction. By providing the convex portions 34A and 34B, in the separators 5A and 5B and the adjacent separators 4B and 4A each having the oxidizing gas communication paths 25, at positions corresponding to the oxidizing gas communication paths 25A and 25B as described above, it is possible to the oxidizing gas communication paths 25A and 25B formed in the separators 5A and 5B can be located toward the adjacent fuel cell units 2B and 2A in the stacking direction (see FIG. 23).

As explained above, in the fuel cell unit 2B (2A), spaces for the oxidizing gas communication paths 25B (25A) are not required at positions corresponding to the oxidizing gas communication paths 25A (25B) formed in the fuel cell unit 2A (2B) as viewed in the stacking direction. Therefore, the oxidizing gas communication paths 25A (25B) of the fuel cell unit 2A (2B) can be located as close to the adjacent fuel cell unit 2B (2A) as possible as viewed in the stacking direction (see the arrow Q in FIGS. 19A and 19B).

Although, the above description is for the oxidizing gas supply port 18, the same description also applies in the case of the oxidizing gas discharge port 21.

Figure 20A:
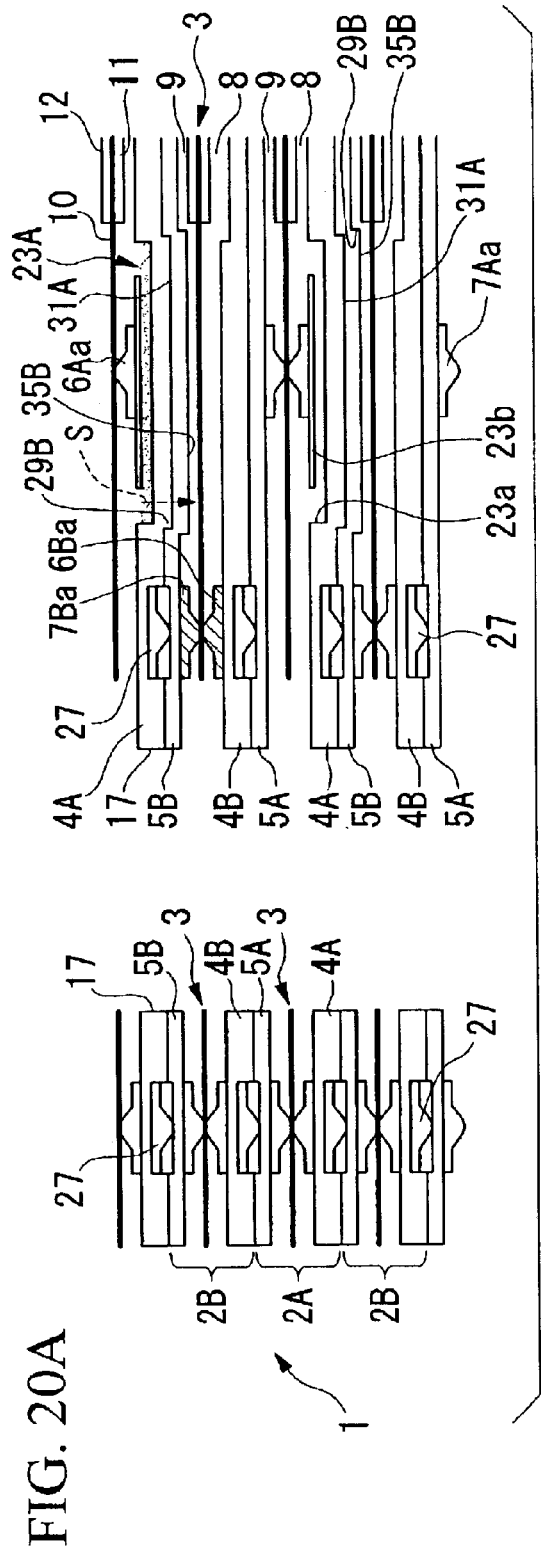
FIG. 20A is a longitudinal cross-sectional view, showing the fuel cell unit according to the first embodiment, taken along the line B—B in FIG. 8.
Figure 20B:
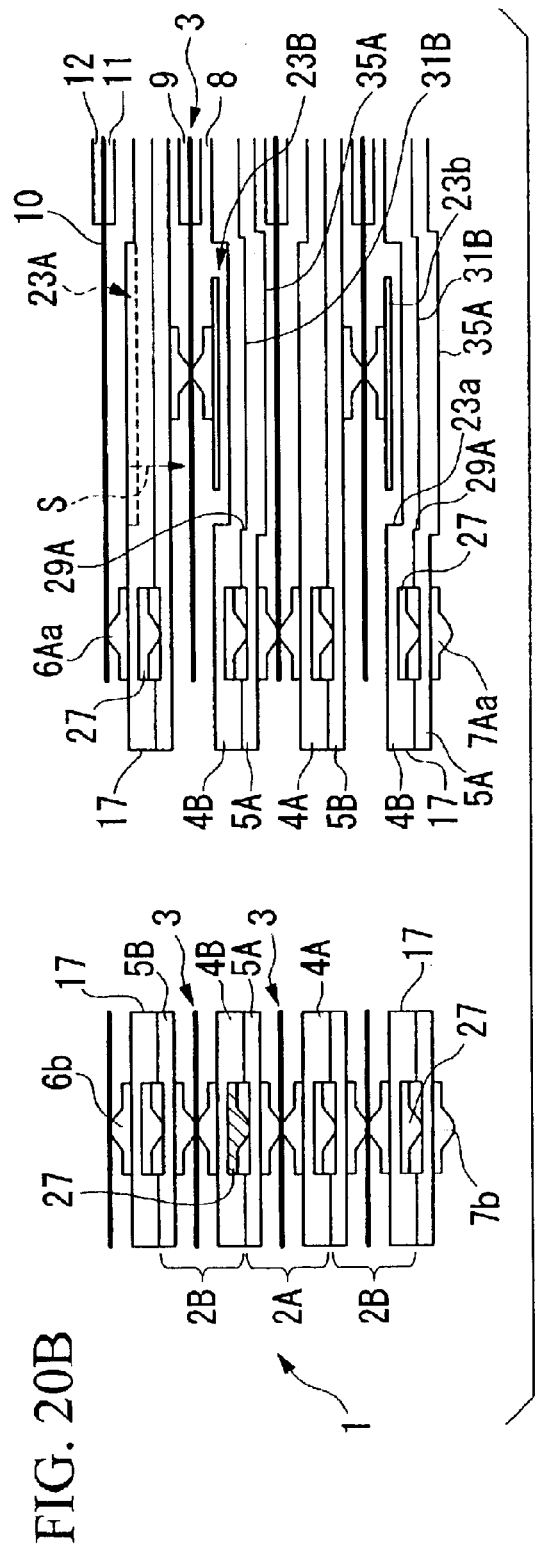
FIG. 20B is a longitudinal cross-sectional view taken along the line E—E in FIG. 9.

Moreover, FIGS. 20A and 20B are longitudinal cross-sectional views with the cross sections taken along the line B—B in FIG. 8 and taken along the line E—E in FIG. 9, respectively. As shown in FIGS. 20A and 20B, there is shown a flow passage that allow the fuel gas to flow from the fuel gas supply port 17 that penetrates each of the separators 4 and 5 in the thickness direction thereof via the fuel gas communication path 23 (23A and 23B) to the fuel gas flow passage 8 that is formed between the anode electrode 11 and the separator 4.

As shown in FIGS. 20A and 20B as well, the gas sealing members 6 and 7 that seal the area between the electrode assembly 3 and the pair of separators 4 and 5 placed on either side thereof are placed sandwiching the electrolyte membrane 10 in the thickness direction thereof at positions opposing each other in the stacking direction of the fuel cell unit 2. The main-loop portion 6a of the gas sealing member 6 for the fuel gas flow passage 8 is placed on a bridge plate 23b that extends right across the fuel gas communication path 23 formed in the separator 4. In other words, the fuel gas communication path 23 detours around the main-loop portion 6a of the gas sealing member 6 in the thickness direction of the separator 4, and connects the interior of the main-loop portion 6a of the gas sealing member 6 with the exterior thereof so as to allow the fuel gas that is supplied from the fuel gas supply port 17 on the exterior side of the main-loop portion 6a of the gas sealing member 6 to flow into the fuel gas passage 8 on the interior side of the main-loop portion 6a of the gas sealing member 6.

As shown in FIGS. 8 and 9, the fuel gas communication paths 23A of the fuel cell unit 2A and the fuel gas communication paths 23B of the fuel cell unit 2B are located so as to be offset with respect to each other in a direction perpendicular to the direction from the fuel gas supply port 17 to the electrode assembly 3 as viewed in the stacking direction. As a result, as shown in FIG. 20A, the gas sealing members 6Ba and 7Ba of the fuel cell unit 2B can be provided so as to be offset, as viewed in the stacking direction, from the positions where the fuel gas communication paths 23A of the fuel cell unit 2A are formed. Moreover, as shown in FIG. 20B, the gas sealing members 6Aa and 7Aa of the fuel cell unit 2A can be provided so as to be offset, as viewed in the stacking direction, from the positions where the fuel gas communication paths 23B of the fuel cell unit 2B are formed.

As shown in FIG. 20A, in the one separator 4A, there are provided the convex portions 31A that protrude from the rear surface of the separator 4A over an area that corresponds to the fuel communication paths 23A. As a result, the fuel gas communication paths 23A that are formed behind the convex portions 31A have sufficient dimensions that are required for allowing the fuel gas to flow. In a manner similar to the separator 4A, in the separator 4B, there are provided the convex portions 31B so that the fuel gas communication paths 23B have sufficient dimensions that are required for allowing the fuel gas to flow.

Moreover, in the other separator 5B that contacts with the separator 4A, there are provided concave portions 29B that accommodate the above-mentioned convex portions 31A, and the convex portions 31A are received in the concave portions 29B. In the other separator 5A that contacts with the separator 4B, there are provided concave portions 29A that accommodate the above-mentioned convex portions 31B, and the convex portions 31B are received in the concave portions 29A. Note that the plane area of the concave portions 29 are formed larger than that of the convex portions 31 so as to facilitate positioning of the convex portions 31 into the concave portions 29.

Furthermore, in the separator 5B, convex portions 35B are formed by projecting the rear surface of the concave portions 29B so that the convex portions 35B and the gas sealing member 7Ba are overlaid as viewed in a direction perpendicular to the stacking direction. In addition, in the separator 5A, convex portions 35A are formed by projecting the rear surface of the concave portions 29A so that the convex portions 35A and the gas sealing member 7Aa are overlaid as viewed in a direction perpendicular to the stacking direction. By providing the convex portions 35A and 35B, in the separators 4A and 4B and the adjacent separators 5B and 5A each having the fuel gas communication paths 23, at positions corresponding to the fuel gas communication paths 23A and 23B as described above, it is possible to the fuel gas communication paths 23A and 23B formed in the separators 4A and 4B can be located toward the adjacent fuel cell units 2B and 2A in the stacking direction.

As explained above, in the fuel cell unit 2B, spaces for the fuel gas communication paths 23B are not required at positions corresponding to the fuel gas communication paths 23A formed in the fuel cell unit 2A as viewed in the stacking direction. Therefore, the fuel gas communication paths 23A of the fuel cell unit 2A may be located as close to the adjacent fuel cell unit 2B as possible as viewed in the stacking direction (see the arrow S in FIGS. 20A and 20B).

The above description also applies in the case of the fuel gas discharge port 20.

In this case, the cooling surface sealing member 27 that seals off each fuel cell unit 2 and delimits the cooling medium flow passage 28 is placed so as to be offset from the fuel gas communication path 23 and oxidizing gas communication path 25 where the gas sealing members 6 and 7 are provided toward the fuel gas supply port 17 and oxidizing gas supply port 18, respectively. As a result, the cooling surface sealing member 27 and the grooves 23a and 25a forming the fuel gas communication paths 23 and oxidizing gas communication paths 25 can be placed substantially in the same plane. Accordingly, it is possible to reduce the thickness of each of the fuel cell units 2 by the amount saved by overlapping as mentioned above.

Therefore, it is possible to ensure the height occupied by the cooling surface sealing member 27 that is needed by the cooling surface sealing member 27 for it to provide a sufficient sealing performance, while at the same time maintaining the thickness of the separators 4 and 5 at the positions where the communication paths 23 and 25 are formed. Moreover, because the thickness needed to form the communication paths 23 and 25 may be secured by the two separators 4 and 5, and there is no need for both of the separators 4 and 5 to each have the thickness needed to form the communication paths 23 and 25, it is possible to reduce the thicknesses needed by the respective separators 4 and 5 by the corresponding amount. Consequently, the height of the fuel cell unit 2 can be substantially reduced.

Note that, in this embodiment, the height of the cooling surface sealing member 27 (see hatched area in FIGS. 19B and 20B) is a barrier when a further reduction in the thicknesses of the fuel cell units 2A and 2B is sought; however, it may be possible to further reduce the overall thickness of the fuel cell stack 1 by overcoming the barrier, i.e., by reducing the height of the cooling surface sealing member 27.

FIG. 21 shows a longitudinal cross-section taken along the line C—C in FIG. 8. According to FIG. 21, a flow passage, which connects the cooling medium supply port 19 to the cooling medium flow passage 28 that is delimited between the two adjacent fuel cell units 2, is shown.

Figures 24A, 24B:
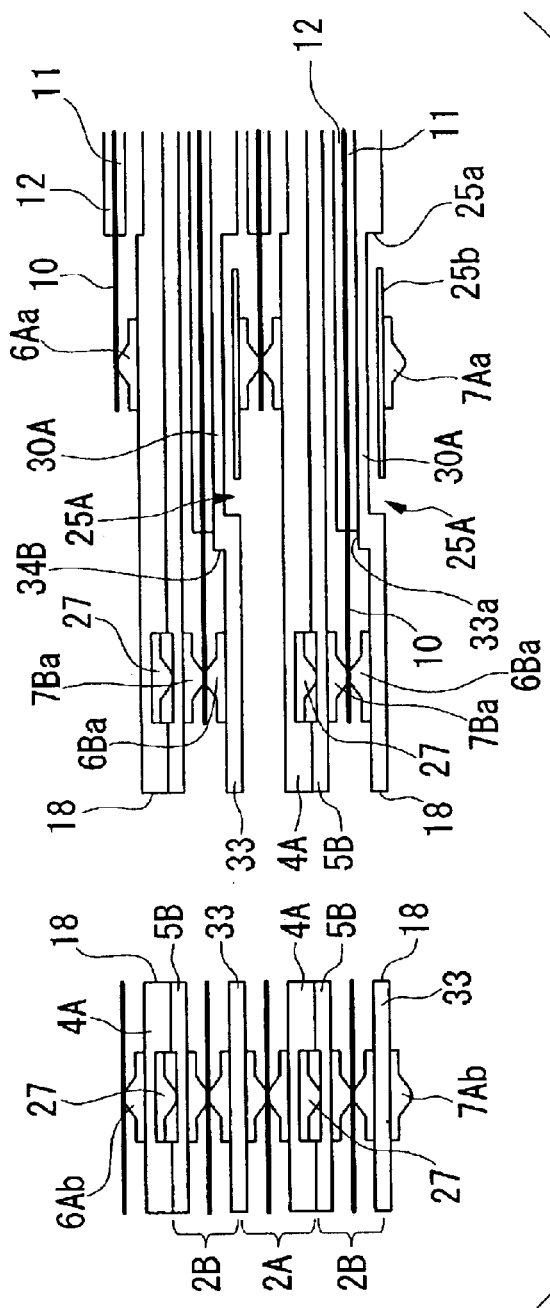

Next, FIGS. 24A and 24B show the second embodiment of the present invention and are longitudinal cross-sectional views corresponding respectively to FIGS. 19A and 19B showing the first embodiment. Note that, in the present embodiment, the same descriptive symbols are given where appropriate to component elements that correspond to those of the first embodiment, and a description thereof is here omitted. This embodiment differs in that a cooling medium flow passage 28 is formed for every two fuel cell units 2A and 2B, and cooling is performed on every two cells (i.e., two fuel cell units). The fuel cell stack 1 of the present embodiment is provided with a separator 33 in which the cooling medium flow passage 28 is not formed, and the separator 33, which corresponds to the separators 4B and 5A in the first embodiment, has a sufficient thickness to allow the formation of the communication paths 23 and 25. In the same way as in the first embodiment, in this embodiment as well, an effect is obtained of being able to reduce the thickness of the separators 4 and 5.

As in the first embodiment, the oxidizing gas communication paths 25A of the fuel cell unit 2A and the oxidizing gas communication paths 25B of the fuel cell unit 2B are located so as to be offset with respect to each other in a direction perpendicular to the direction from the oxidizing gas supply port 18 to the electrode assembly 3 as viewed in the stacking direction. In this embodiment, the gas sealing members 6 and 7 of the fuel cell unit 2B (see the main-loop portions 6Ba and 7Ba indicated by the hatched areas in FIG. 19A) are located so as to be offset from the oxidizing gas communication paths 25A of the fuel cell unit 2A as viewed in the stacking direction. As a result, the oxidizing gas communication paths 25A of the fuel cell unit 2A can be located as close to the adjacent fuel cell unit 2B as possible as viewed in the stacking direction (see the arrow Q in FIGS. 19A and 19B).

In this embodiment, as shown in FIG. 24A, the separators 4A and 5B do not contact with the separator 33 in which the oxidizing gas communication paths 25A are formed. Therefore, the convex portions 34B are formed by projecting the rear surface 33a of the separator 33 at positions where the oxidizing gas communication paths 25A are formed, and the convex portions 34B and the main-loop portion 6Ba of the sealing member 6 are overlaid as viewed in a direction perpendicular to the stacking direction. In this embodiment, the convex portions 34B contact with the electrode assembly 3 of the fuel cell unit 2B, whereby reduction in the dimension in the stacking direction can be maximized.

Furthermore, as shown in FIG. 24B, because the separator 4A contacts with the separator 5B in which the oxidizing gas communication paths are formed, as in the first embodiment, the dimension in the stacking direction can be reduced by providing the convex portions 30B behind the oxidizing gas communication paths 25B in the separator 5B, and by providing the concave portions 32A that can accommodate the convex portions 30B while providing the convex portions 34A that protrude from the rear surfaces of the concave portions 32A in the separator 4A.

In addition, in the present embodiment, the fuel gas communication paths 23A and the fuel gas communication paths 23B are similarly formed (see the arrow S in FIGS. 20A and 20B), whereby the overall thickness of the fuel cell stack 1 is reduced. Moreover, in the present embodiment, the size of the electrode assembly 3 in the fuel cell unit 2B is made larger than the size of the electrode assembly 3 in the fuel cell unit 2A in order to improve electrical generation efficiency and to increase the rigidity of the electrode assembly 3. Note that if the sealing members 6 and 7 can be located so as to be offset with respect to each other, the electrode assemblies 3 in the fuel cell units 2A and 2B may be of the same size with respect to each other as in the first embodiment.

As explained above, in the present embodiment, because the cooling medium flow passage 28 is provided in every two fuel cell units 2A and 2B, the cooling surface sealing member 27 is not necessary between the fuel cell units 2A and 2B between which the cooling medium flow passage 28 is not formed. Accordingly, the overall thickness of the fuel cell stack 1 is preferably further reduced. In addition, an effect is obtained that it is possible to reduce the members used for cooling such as the cooling surface sealing member 27 by the same amount as the decrease in the locations where the cooling medium communication path 28 is formed, and this allows a simplification of the manufacturing process. Note that, in the present embodiment a description is given of when cooling is performed for every two cells; however, the present invention is not limited to this and the fuel cell may also be structured such that cooling is performed for every three or more fuel cell units 2.

Figure 16A:
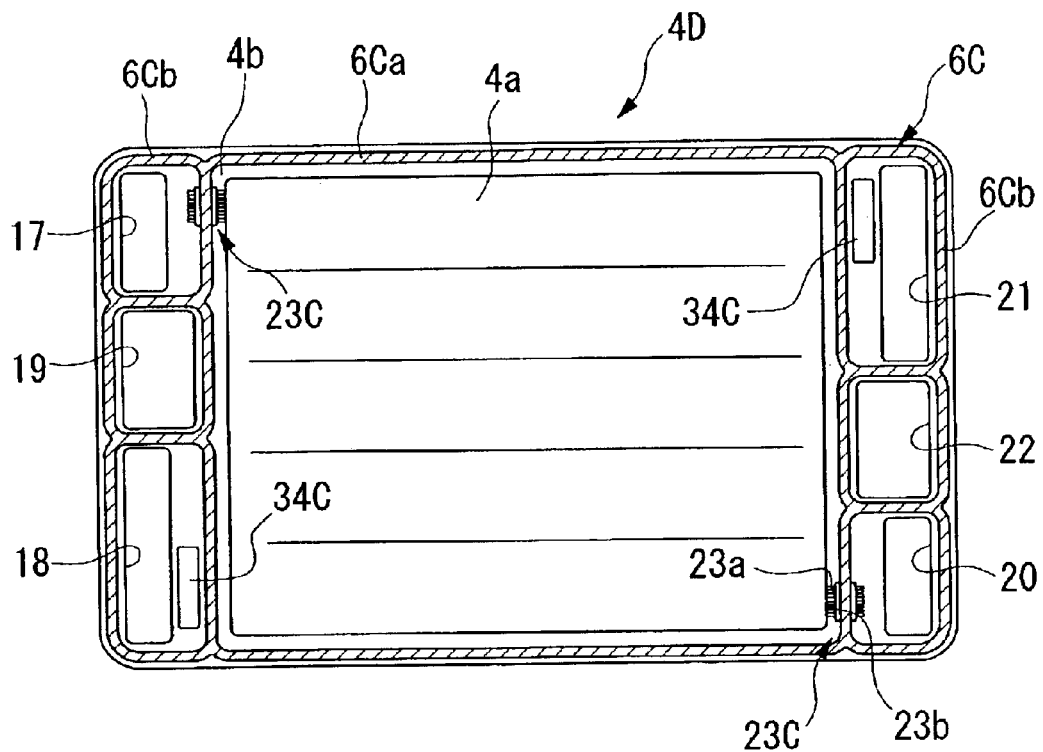
FIGS. 16A and 16B are plan views showing a fuel cell unit forming the fuel cell stack according to the third and fourth embodiments of the present invention.
Figure 16B:
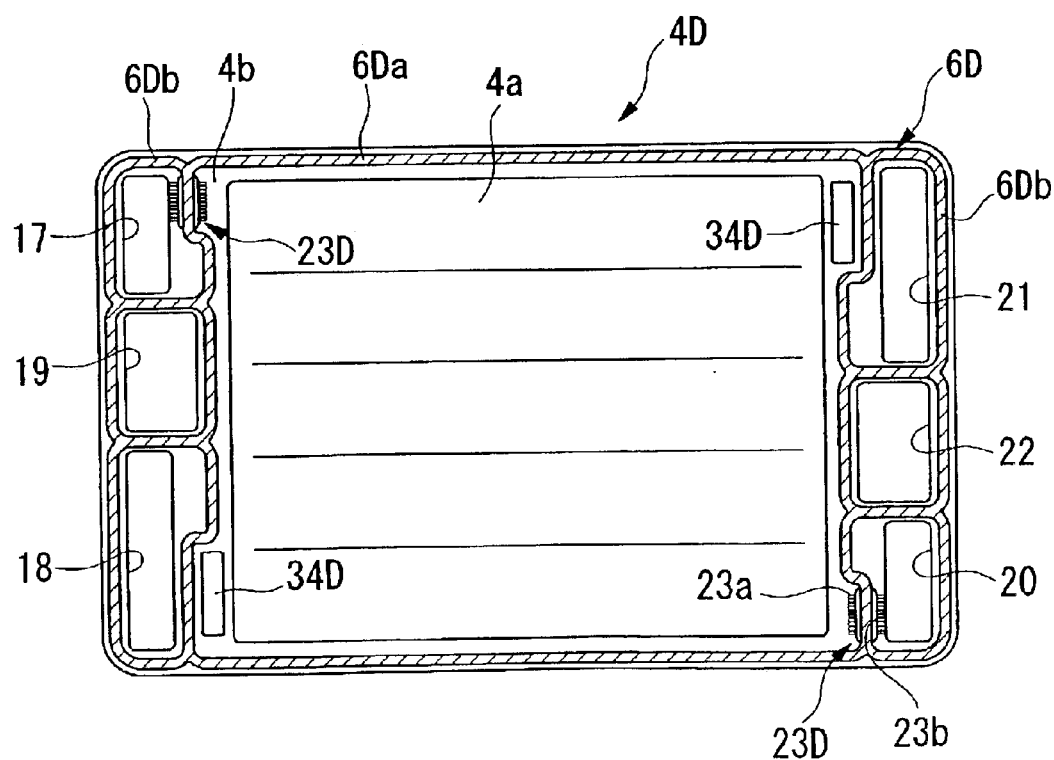
Figure 25:
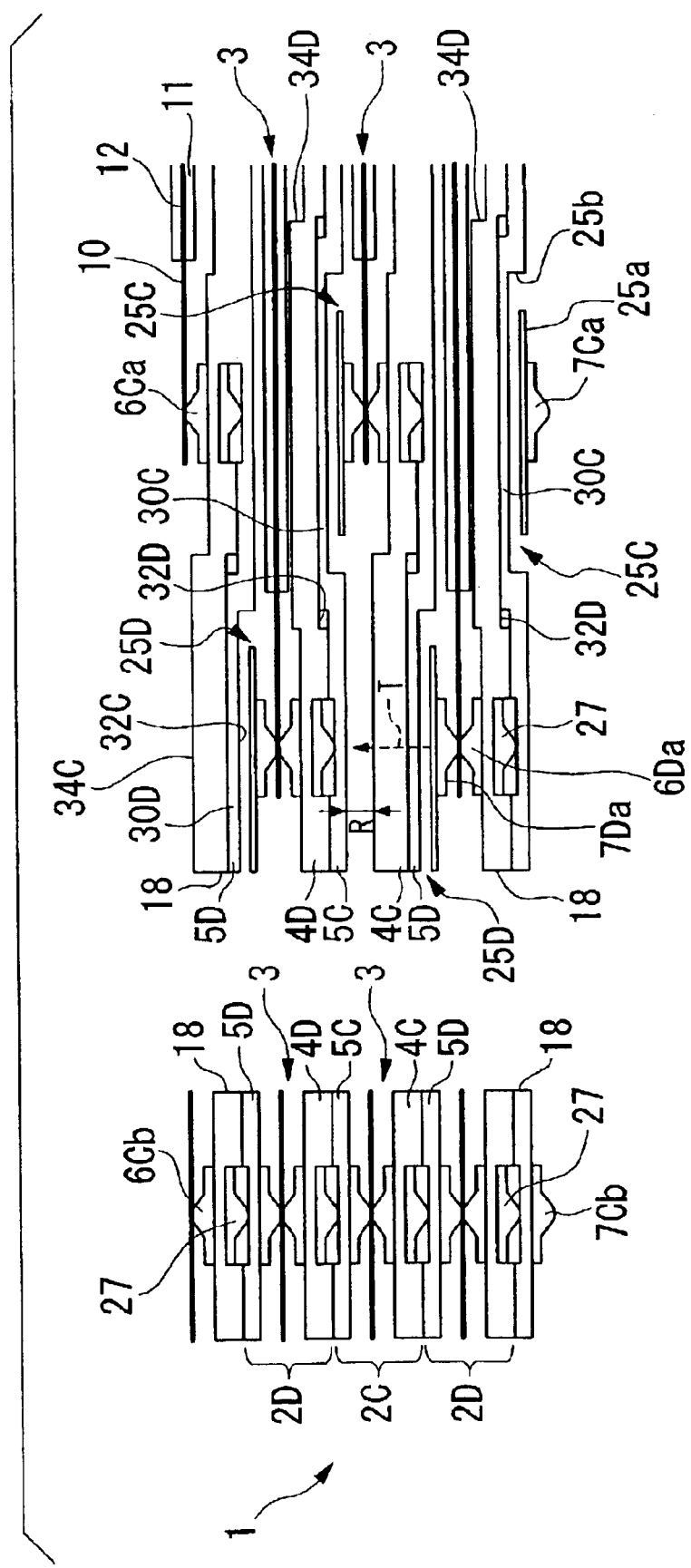
FIG. 25 is a longitudinal cross-sectional view showing the third embodiment of the present invention, corresponding to FIG. 19A showing the first embodiment.
Figure 26:
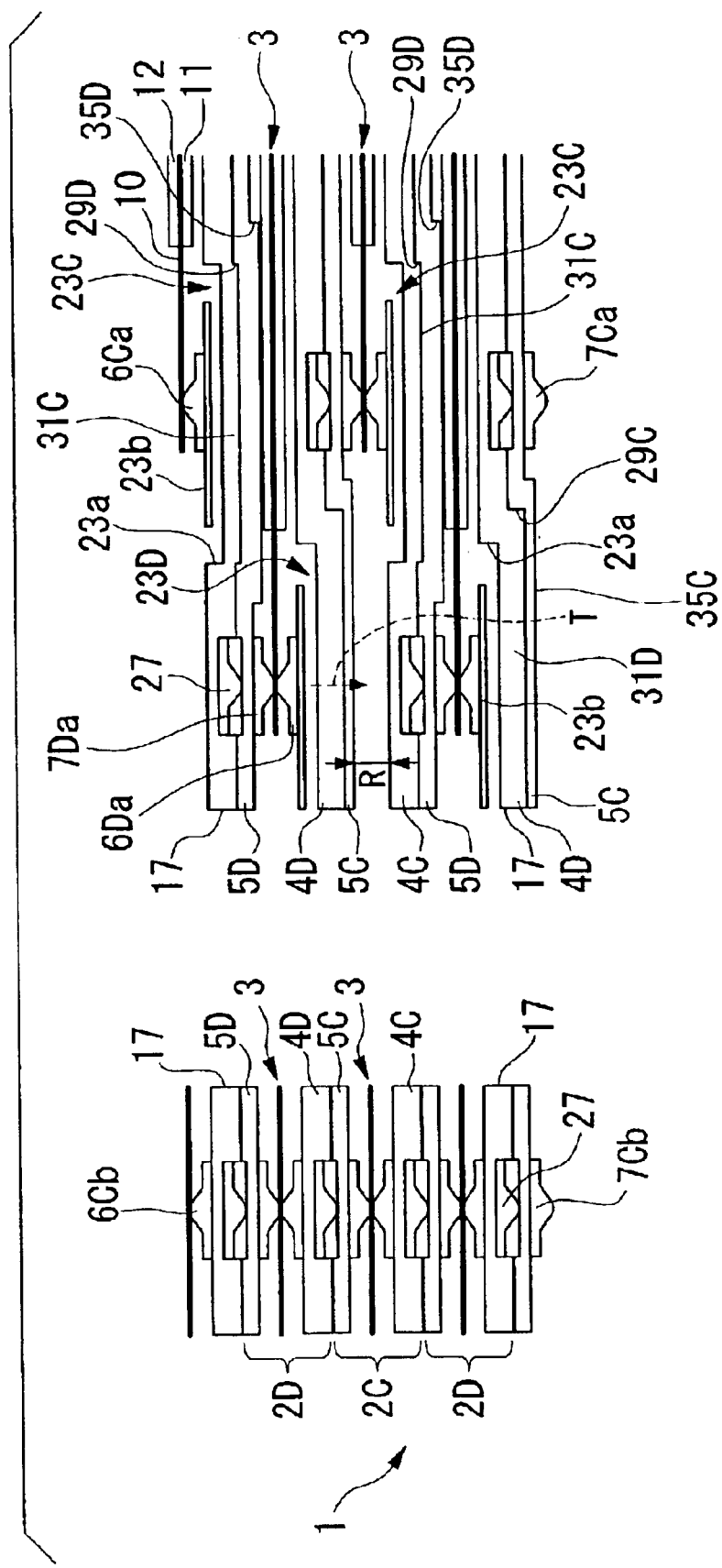
FIG. 26 is a longitudinal cross-sectional view, corresponding to FIG. 20A showing the first embodiment, showing the third embodiment of the present invention.

Next, FIGS. 25 and 26 show the third embodiment of the present invention and are longitudinal cross-sectional views corresponding respectively to FIGS. 19A and 20A in the first embodiment. As shown in FIGS. 25 and 26, the fuel cell stack 1 in the present embodiment comprises fuel cell stacks 2C and fuel cell stacks 2D. As shown in FIGS. 16A and 16B, the fuel gas communication paths 23C of the fuel cell unit 2C and the fuel gas communication paths 23D of the fuel cell unit 2D are located so as to be offset with respect to each other in the direction from the fuel gas supply port 17 to the electrode assembly 3 (the fuel gas flow passage 9) as viewed in the stacking direction. As a result, as shown in FIG. 26, in the fuel cell unit 2D, spaces for the fuel gas communication paths 23D are not required at positions corresponding to the fuel gas communication paths 23C formed in the fuel cell unit 2C as viewed in the stacking direction.

In addition, it is possible to form the fuel gas communication paths 23D in the fuel cell unit 2D so as to be disposed outward from the electrode assembly 3 of the fuel cell unit 2C as viewed in the stacking direction. Accordingly, it is possible to dispose the gas sealing members 6a and 7a of the fuel cell unit 2D, as viewed in the stacking direction, so as to be offset from the fuel gas communication paths 23C formed in the fuel cell unit 2C and so as to be disposed outward from the electrode assembly 3 of the fuel cell unit 2C. The portion in the fuel cell unit 2C, corresponding to the fuel gas communication path 23D formed in the fuel cell unit 2D as viewed in the stacking direction, opens to the fuel gas supply port 17. If the space (see the arrow R in FIG. 26) of the above-mentioned portion is sufficient to make the fuel gas to flow with respect to the electrode assembly 3, the portion where the fuel gas communication path 23D of the fuel cell unit 2D is formed may be positioned so as to protrude beyond the plane of the electrode assembly 3 of the fuel cell unit 2C (see the arrow T) in the stacking direction; thus, it is possible to reduce the thicknesses of the fuel cell units 2C and 2D by the amount saved in this way. The same description also applies in the case of the fuel gas communication paths 23C and 23D provided in the vicinity of the fuel gas discharge port 20.

Moreover, as shown in FIG. 25, in the present embodiment, the oxidizing gas communication paths 25C of the fuel cell unit 2C and the oxidizing gas communication paths 25D of the fuel cell unit 2D are located so as to be offset with respect to each other in the direction from the oxidizing gas supply port 18 to the electrode assembly 3 as viewed in the stacking direction. As a result, the portion where the oxidizing gas communication path 25D of the fuel cell unit 2D is formed may be positioned beyond the electrode assembly 3 of the adjacent fuel cell unit 2C in the stacking direction; thus, it is possible to reduce the thicknesses of the fuel cell units 2C and 2D. The same description also applies in the case of the oxidizing gas communication paths (not shown) provided in the vicinity of the oxidizing gas discharge port 21. Although, as in the first embodiment, the cooling surface sealing member 27 is the barrier for further reducing the thicknesses of the fuel cell units 2C and 2D, the overall thickness of the fuel cell stack 1 may be further reduced by overcoming the barrier as in the first embodiment.

Figure 27:
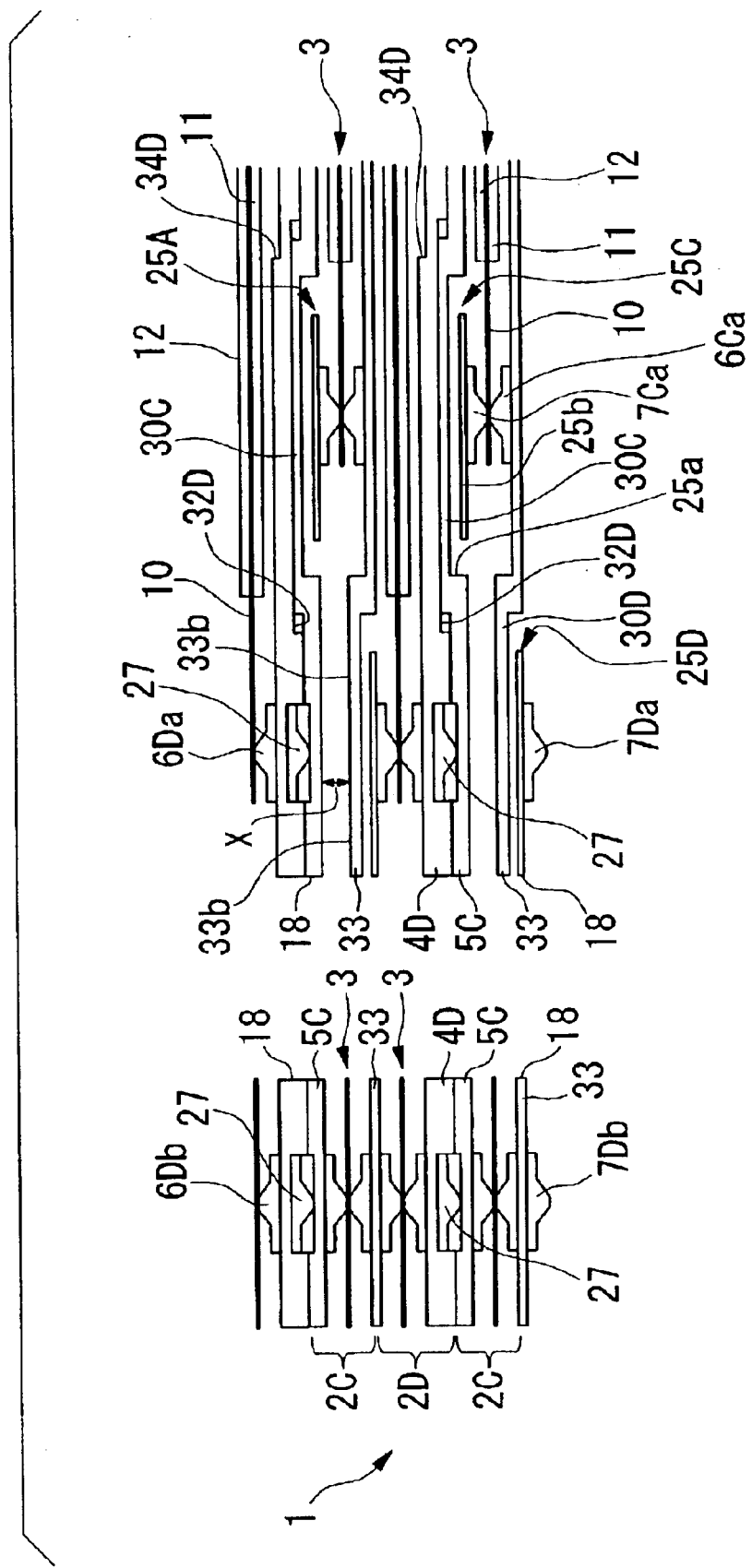
FIG. 27 is a longitudinal cross-sectional view showing the fourth embodiment of the present invention, corresponding to FIG. 25 showing the third embodiment.

Next, FIG. 27 shows the fourth embodiment of the present invention and is a longitudinal cross-sectional view corresponding to FIG. 25 of the third embodiment. This embodiment differs from the third embodiment in that a cooling medium flow passage 28 is formed for every two fuel cell units 2C and 2D, and cooling is performed on every two cells (i.e., two fuel cell units). The fuel cell stack 1 of the present embodiment is provided with a separator 33 (corresponding to the separators 4D and 5C in the third embodiment) in which the cooling medium flow passage 28 is not formed, and a cooling surface sealing member 27 need not be provided to the separator 33. As a result, the portion where the oxidizing gas communication path 25D of the fuel cell unit 2D is formed can be positioned beyond the electrode assembly 3 of the fuel cell unit 2C (see the arrow T in FIG. 25) in the stacking direction as was explained in the third embodiment.

In the present embodiment, as shown in FIG. 27, the separator 33 is formed so that the rear surface 33b of the portion of the separator 33 where the oxidizing communication path 25D protrudes toward the plane of the electrode assembly 3. Note that as long as a space needed for ensuring the flow rate of the oxidizing gas supplied to or discharged from the electrode assembly 3 is ensured, the rear surface 33b of the separator 33 may be disposed so as to protrude beyond the plane of the electrode assembly 3, and so as to further reduce the dimension X shown in FIG. 27. The same description also applies in the case of the fuel gas communication paths provided in the fuel cell units 2C and 2D. The overall thickness of the fuel cell stack 1 is reduced using the above-mentioned measures.

Figure 17A:
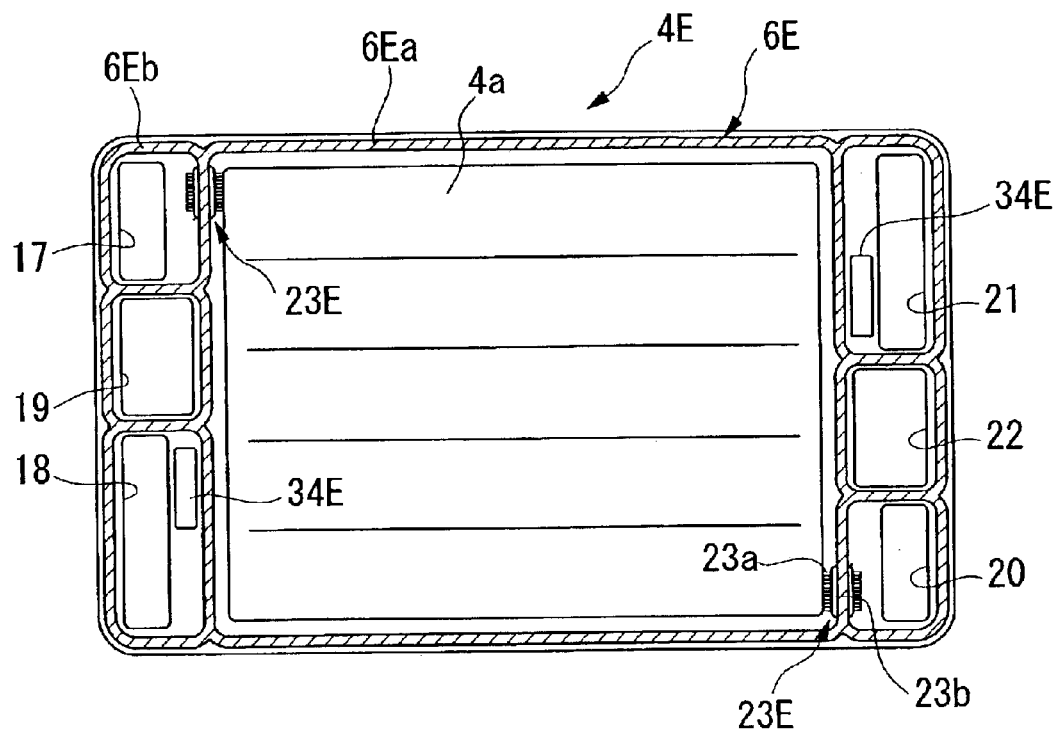
FIGS. 17A and 17B are plan views showing a fuel cell unit forming the fuel cell stack according to fifth and sixth embodiments of the present invention.
Figure 17B:
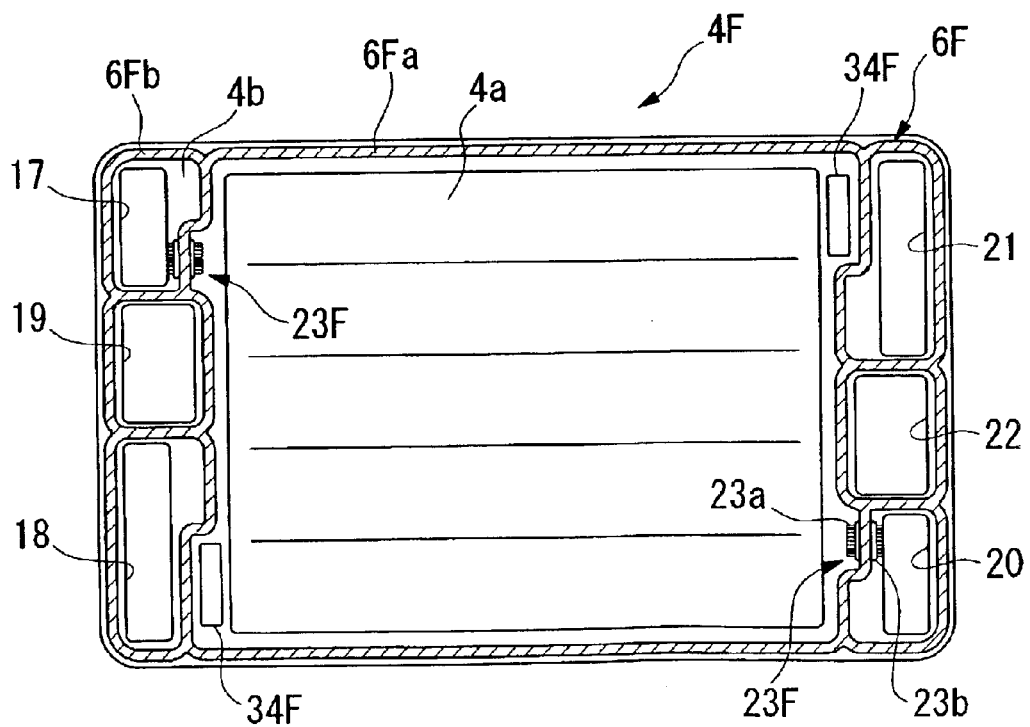
Figure 18A:
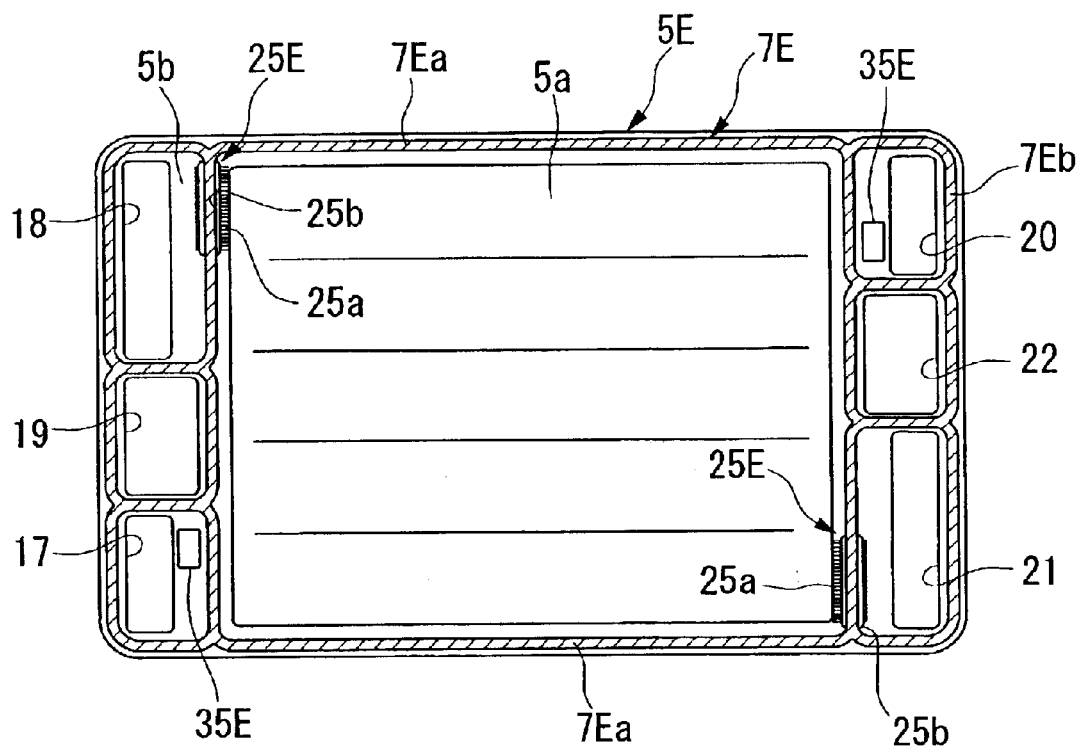
FIGS. 18A and 18B are also plan views showing the fuel cell unit forming the fuel cell stack according to the fifth and sixth embodiments of the present invention.
Figure 18B:
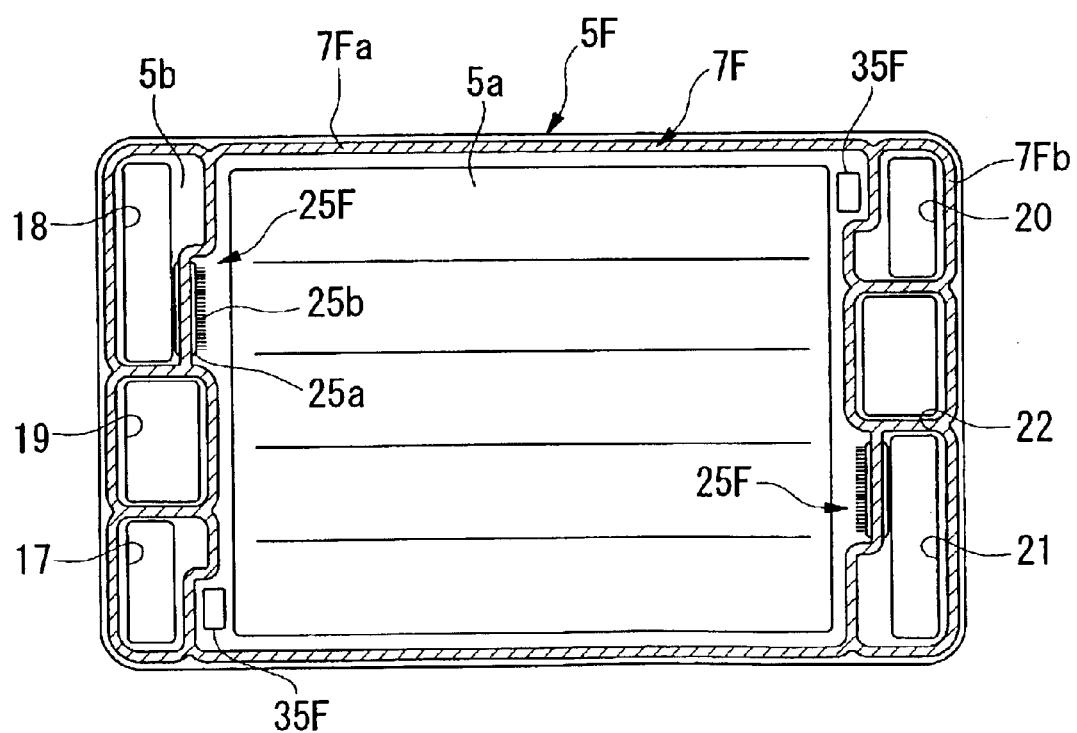

Next, FIGS. 28A, 28B, 29A, and 29B show the fifth embodiment of the present invention and are longitudinal cross-sectional views corresponding respectively to FIGS. 19A, 19B, 20A, and 20B of the first embodiment. The fuel cell stack 1 of the present embodiment comprises fuel cell units 2E and fuel cell units 2F as shown in FIGS. 28A, 28B, 29A, and 29B. As shown in FIGS. 17A and 17B, the fuel gas communication paths 23E of the fuel cell unit 2E and the fuel gas communication paths 23F of the fuel cell unit 2F are located so as to be offset with respect to each other in the direction from the fuel gas supply port 17 to the electrode assembly 3 and also in a direction intersecting the aforementioned direction. As a result, in the fuel cell unit 2F, spaces for the fuel gas communication paths 23F are not required at positions corresponding to the fuel gas communication paths 23E formed in the fuel cell unit 2E as viewed in the stacking direction. In addition, because the fuel gas communication paths 23E of the fuel cell unit 2E and the fuel gas communication paths 23F of the fuel cell unit 2F are located so as to be offset with respect to each other in the direction from the fuel gas supply port 17 to the electrode assembly 3, it is possible to dispose the gas sealing members 6a and 7a of the fuel cell unit 2F, as viewed in the stacking direction, so as to be offset from the fuel gas communication paths 23E formed in the fuel cell unit 2E and so as to be disposed so as to protrude beyond the plane of the electrode assembly 3 of the fuel cell unit 2E.

Figure 28A:
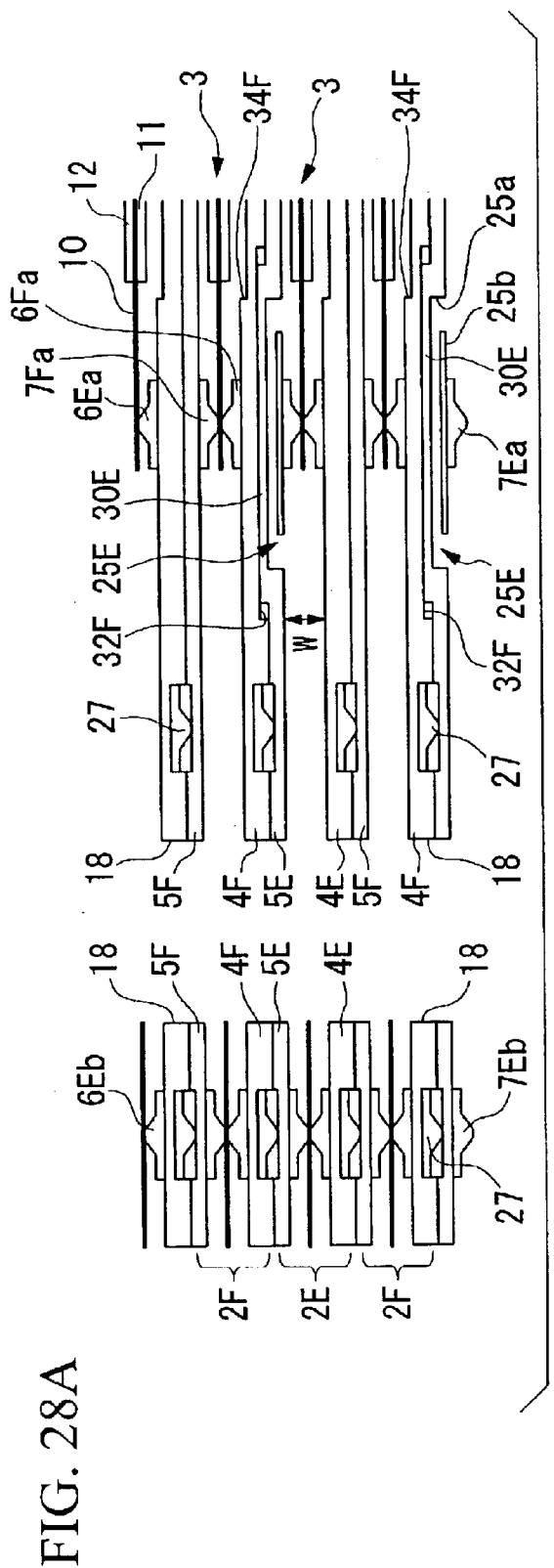
FIGS. 28A and 28B are longitudinal cross-sectional views showing the fifth embodiment of the present invention, corresponding to FIGS. 19A and 19B showing the first embodiment.
Figure 28B:
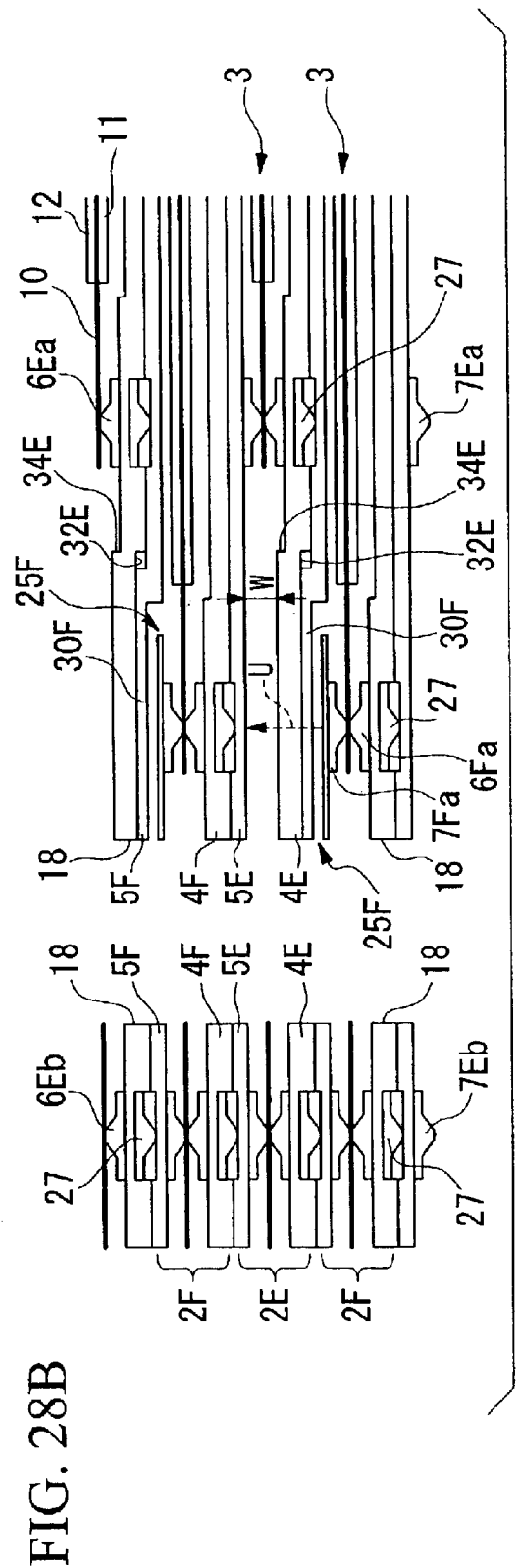

Moreover, in the fuel cell unit 2E, the fuel gas does not flow through the portions corresponding to the reaction gas communication paths 23F formed in the fuel cell unit 2F, as viewed in the stacking direction. Therefore, if the dimensions of the above-mentioned portions are sufficient to ensure electrical insulation performance thereof, the portions where the reaction gas communication paths 23F are formed in the fuel cell unit 2F may be projected toward the electrode assembly 3 of the fuel cell unit 2E; thus, it is possible to reduce the thicknesses of the fuel cell units 2E and 2F by the amount saved in this way (see the arrow U in FIG. 29B). The same description also applies in the case of the fuel gas communication paths 23E and 23F provided in the vicinity of the fuel gas discharge port 20. In addition, as shown in FIGS. 28A and 28B, the same description also applies in the case of the oxidizing gas communication paths 25E of the fuel cell unit 2E and the oxidizing gas communication paths 25F of the fuel cell unit 2F. As a result, it is possible to reduce the thicknesses of the fuel cell units 2E and 2F. If the above-mentioned dimension required for ensuring electrical insulation performance (see the arrow W in FIG. 28B) is smaller than the dimension required for ensuring to make the reaction gases (i.e., the fuel gas and oxidizing gas) to flow (see the arrow R in FIG. 26), it is possible to further reduce the thicknesses of the fuel cell units 2E and 2F than in the case of the fuel cell units 2C and 2D in the third embodiment. Note that, in the present embodiment as in the first embodiment, the height of the cooling surface sealing member 27 is a barrier when a further reduction in the thicknesses of the fuel cell units 2E and 2F is sought; however, it may be possible to further reduce the overall thickness of the fuel cell stack 1 by overcoming the barrier, i.e., by reducing the height of the cooling surface sealing member 27, as in the case of the first embodiment.

Figures 30A, 30B:
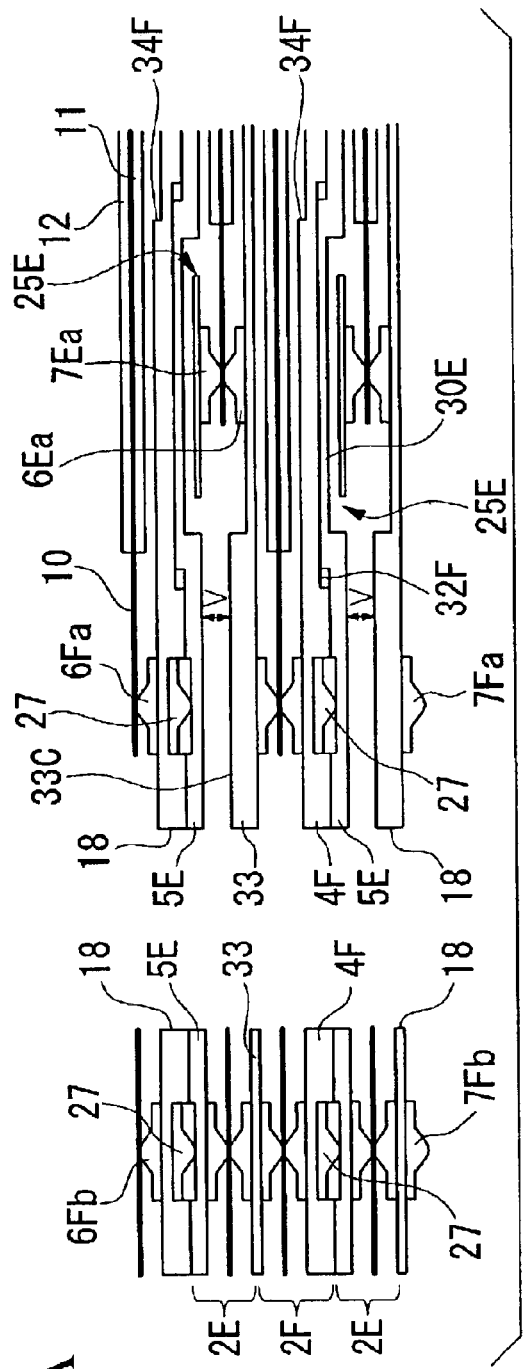
FIGS. 30A and 30B are longitudinal cross-sectional views showing the sixth embodiment of the present invention, corresponding to FIGS. 28A and 28B showing the fifth embodiment.
Figure 32A:
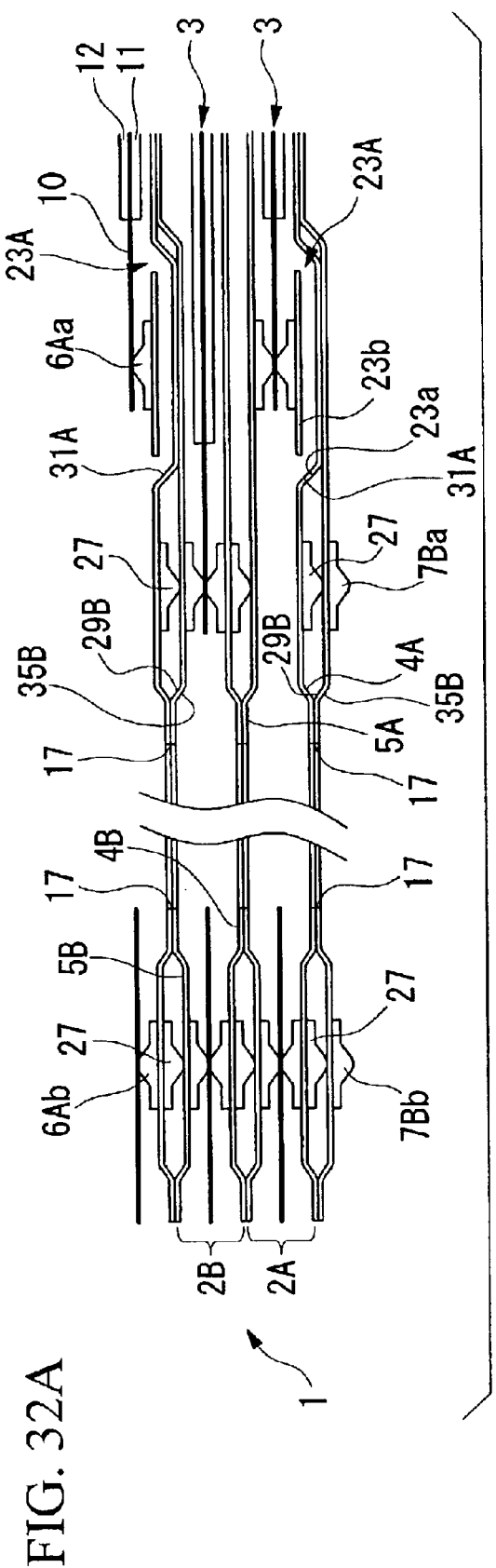
FIGS. 32A and 32B are longitudinal cross-sectional views showing the seventh embodiment of the present invention, corresponding to FIGS. 20A and 20B showing the first embodiment.
Figure 32B:
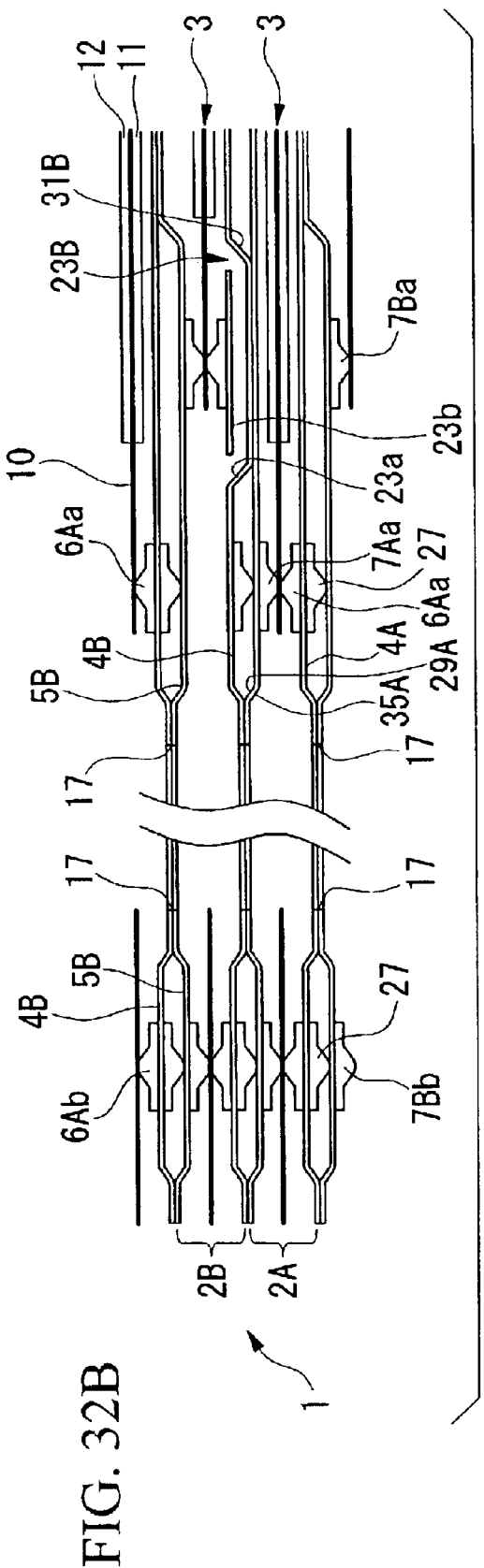
Figure 33:
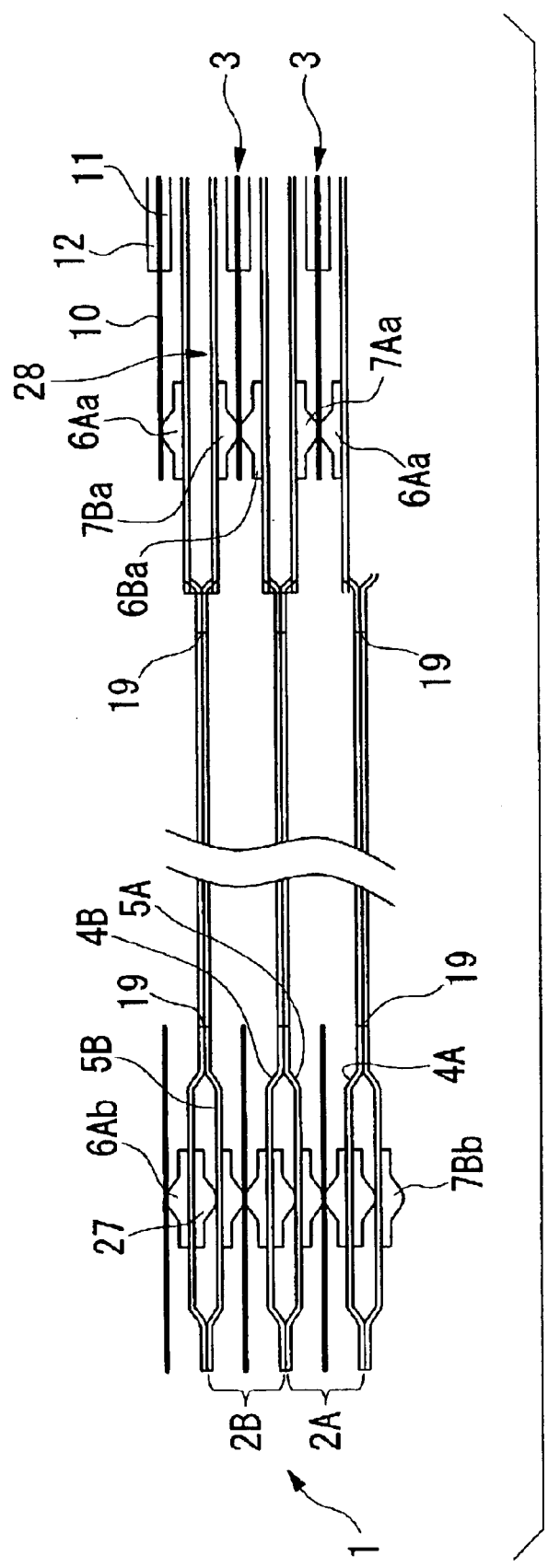
FIG. 33 is a longitudinal cross-sectional view showing the seventh embodiment of the present invention, corresponding to FIG. 21 showing the first embodiment.
Figure 34:
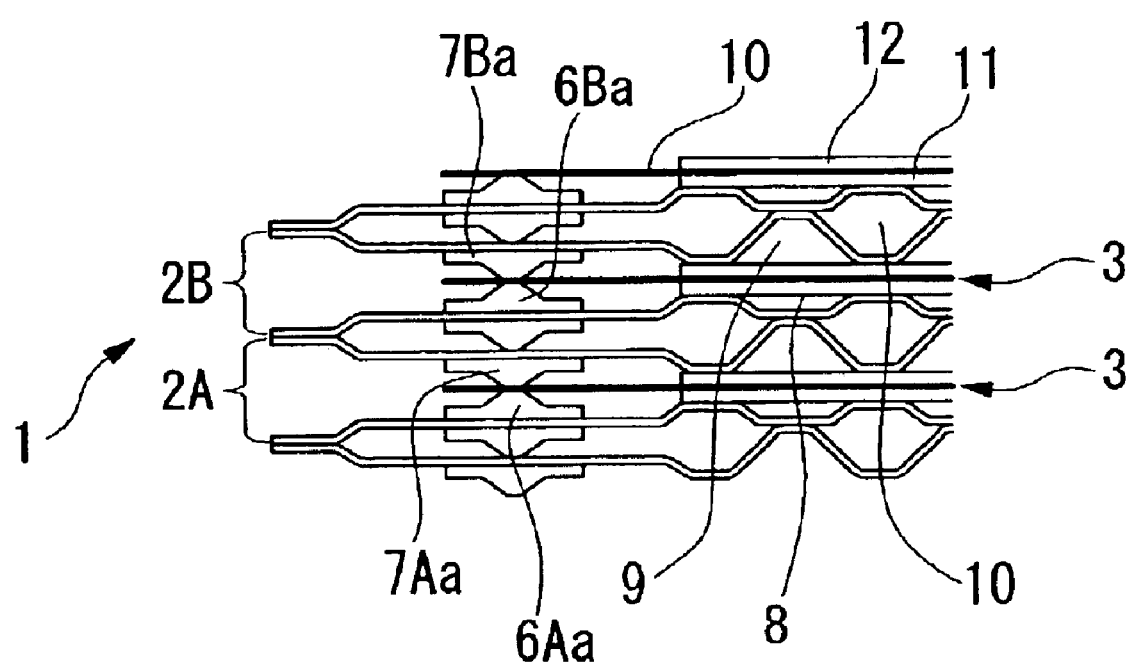
FIG. 34 is a longitudinal cross-sectional view showing the seventh embodiment of the present invention, corresponding to FIG. 22 showing the first embodiment.
Figure 35:
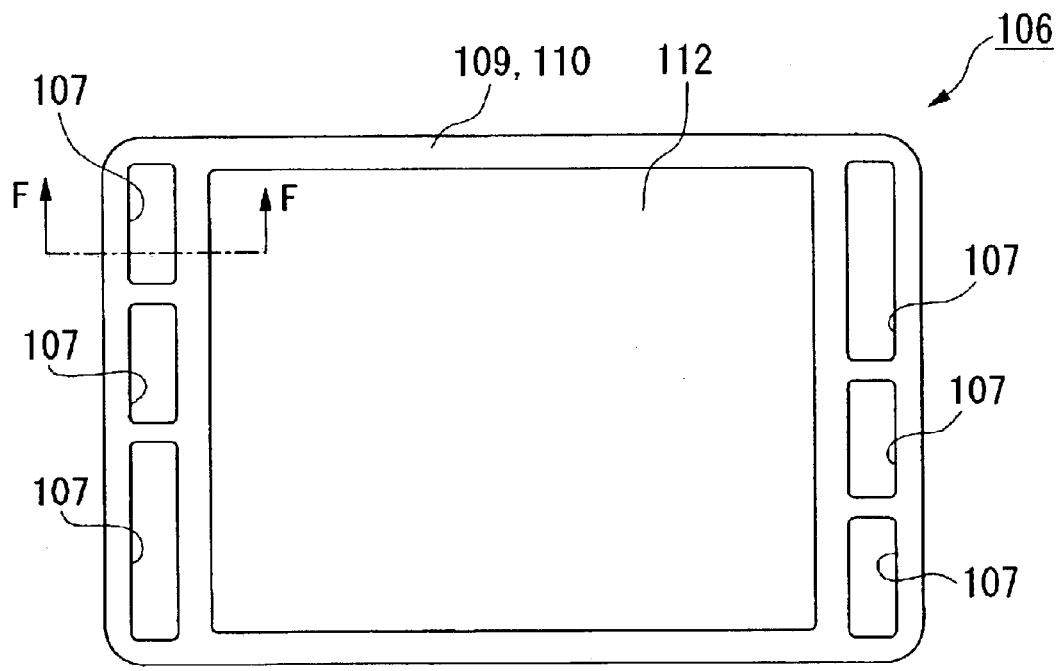
FIG. 35 is a plan view schematically showing a fuel cell unit in a conventional fuel cell.
Figure 36:
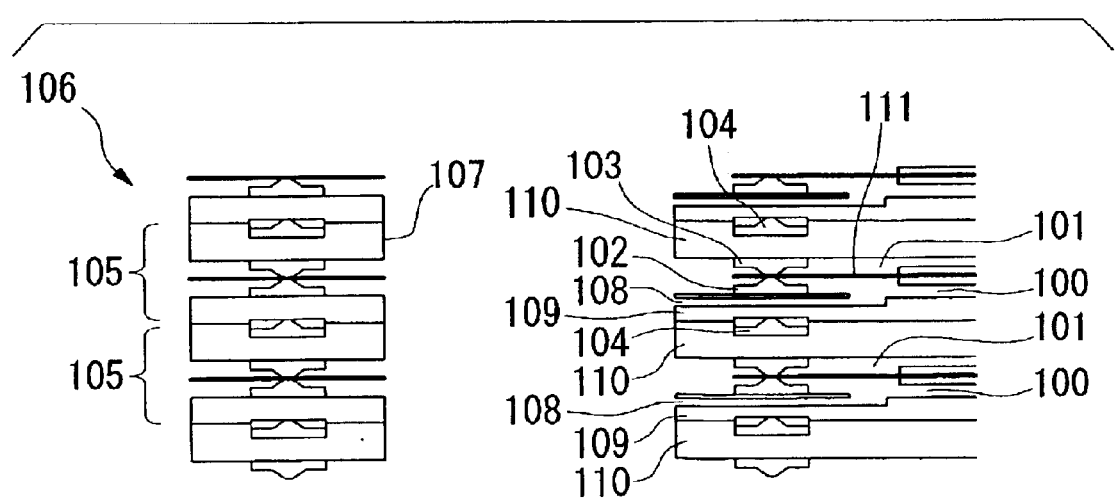
FIG. 36 is a longitudinal cross-sectional view showing the vicinity of a fuel gas communication port in the conventional fuel cell.

FIGS. 30A and 30B show the sixth embodiment of the present invention and are longitudinal cross-sectional views corresponding respectively to FIGS. 28A and 28B of the fifth embodiment. This embodiment differs from the fifth embodiment in that a cooling medium flow passage 28 is formed for every two fuel cell units 2E and 2F, and cooling is performed on every two cells (i.e., two fuel cell units). The fuel cell stack 1 of the present embodiment is provided with a separator 33 (corresponding to the separators 4F and 5E in the fifth embodiment) in which the cooling medium flow passage 28 is not formed, and a cooling surface sealing member 27 need not be provided to the separator 33. As a result, the portion where the oxidizing gas communication path 25F of the fuel cell unit 2F is formed can be positioned beyond the electrode assembly 3 of the fuel cell unit 2E in the stacking direction as was explained in the fifth embodiment; thus, it is possible to reduce the thicknesses of the fuel cell units 2E and 2F by the amount saved in this way.

In the present embodiment, as shown in FIGS. 30A and 30B, the rear surface 33c behind the oxidizing gas communication path 25F of the separator 33 is disposed so as to be close to the opposing separator 4E while ensuring a distance therebetween (see the arrow V), which is required for ensuring electrical insulation performance. The rear surface 33c of the separator 33 may be disposed so as to have a distance smaller than the distance V shown in FIGS. 30A and 30B and so that the rear surface 33c protrudes from the plane of the electrode assembly 3 of the fuel cell 2E as long as electrical insulation performance can be ensured. The same description also applies in the case of the fuel gas communication paths (not shown), and thus, the overall thickness of the fuel cell stack 1 can be reduced. If the above-mentioned distance required for ensuring electrical insulation performance (see the arrow V in FIGS. 30A and 30B) is smaller than the dimension required for ensuring to make the reaction gases (i.e., the fuel gas and oxidizing gas) to flow (see the arrow X in FIG. 27), it is possible to further reduce the thicknesses of the fuel cell units 2E and 2F than in the case of the fuel cell units 2C and 2D in the fourth embodiment.

Next, FIGS. 31A, 31B, 32A, 32B, 33, and 34 show the seventh embodiment of the present invention and are longitudinal cross-sectional views corresponding respectively to FIGS. 19A, 19B, 20A, 20B, 21, and 22 of the first embodiment. In this embodiment, both the separators 4 and 5 are provided with corrugated portions 4a and 5a, supply ports 17 to 19, discharge ports 20 to 22, and planar sections 4b and 5b, as shown in FIG. 1, by press forming a stainless steel plate with a plate thickness of approximately 0.2 to 0.5 mm. In the same way as in the first embodiment, in the fuel cell stack 1 of the present embodiment, the cooling surface sealing member 27 that seals off the fuel cell units 2A and 2B and delimits the cooling medium flow passage 28 is placed at a position closer to the respective supply ports 17 and 18 than the communication paths 23 and 25 where the main-loop portion 7a of the gas sealing member 7 is provided.

As a result, the cooling surface sealing member 27 can be placed substantially in the same plane as the grooves 23a and 25a of the oxidizing gas communication paths 23 and 25 that are formed by joining together surfaces of both the separators 4 and 5. It is therefore possible to reduce the thickness of each fuel cell unit 2 by the amount of this overlapping portion.

Moreover, convex portions 30A and 30B are provided on the separators 5A and 5B extending over areas corresponding to the gas communication paths 25A and 25B, and convex portions 34B and 34A are provided on the separators 4B and 4A extending over areas corresponding to the gas communication paths 25A and 25B. The convex portions 30A and 30B are received in concave portions 32B and 32A formed behind the convex portions 34B and 34A. Convex portions 31A and 31B are provided on the separators 4A and 4B extending over areas corresponding to the gas communication paths 23A and 23B, and convex portions 35B and 35A are provided on the separators 5B and 5A extending over areas corresponding to the gas communication paths 23A and 23B. The convex portions 31A and 31B are received in concave portions 29B and 29A formed behind the convex portions 35B and 35A. Accordingly, in the same way as in the first embodiment, it is possible to reduce the thickness of each of the fuel cell units 2A and 2B and to greatly reduce the thickness of the fuel cell stack 1 even if the separators 4 and 5 are formed by press forming a metal material.

Moreover, the fuel cell stack 1 according to the second to sixth embodiments may be formed using the separators 4 and 5 that are thus formed by press forming.

INDUSTRIAL APPLICABILITY

As is clear from the above description, the present invention provides the following effects.

(1) According to the fuel cell according to the first aspect of the present invention, it is possible to shift, in the stacking direction, the portions of one fuel cell unit where the reaction gas communication paths are formed toward the portions of the adjacent fuel cell unit where the reaction gas communication paths are formed as close as possible. Accordingly, the thickness of the fuel cell units at the portions where the reaction gas communication paths are formed can be reduced by the amount saved in this way. As a result, an effect is obtained that it is possible to greatly reduce the thickness of the fuel cell that is formed by stacking up a plurality of the fuel cell units.

(2) According to the fuel cell according to the second aspect of the present invention, it is possible to dispose the portions of one fuel cell unit, where the reaction gas communication paths are formed, so as to protrude beyond the plane of the electrode assembly of the adjacent fuel cell unit. Accordingly, the thickness of the fuel cell units can be reduced by the amount saved in this way. As a result, an effect is obtained that it is possible to further greatly reduce the thickness of a fuel cell that is formed by stacking up a plurality of fuel cell units.

(3) According to the fuel cell according to the third or fourth aspect of the present invention, it is possible to dispose the portions of one fuel cell unit, where the reaction gas communication paths are formed, so as to be as close to the adjacent fuel cell unit as possible in the stacking direction. In addition, in a case in which the reaction gas communication paths formed in one of the fuel cell units and the corresponding reaction gas communication paths formed in the adjacent fuel cell unit in the stacking direction are disposed so as to be offset with respect to each other in the direction from the reaction gas communication ports to the reaction gas flow passages as viewed in the stacking direction, it is possible to dispose the portions of the separator of one fuel cell unit where the reaction gas communication paths are formed and the portions of the separator of the adjacent fuel cell unit where the reaction gas communication paths are formed as close as the minimum dimension sufficient to ensure electrical insulation performance, as viewed in the stacking direction. As a result, an effect is obtained that it is possible to further greatly reduce the thickness of a fuel cell that is formed by stacking up a plurality of fuel cell units.

(4) According to the fuel cell according to the fifth aspect of the present invention, it is possible to dispose the cooling surface sealing member and the communication paths so as to overlap with respect to each other substantially within a plane. Accordingly, the thickness of each of the fuel cell units can be reduced by the amount saved by overlapping. As a result, an effect is obtained that it is possible to further greatly reduce the thickness of a fuel cell that is formed by stacking up a plurality of fuel cell units.

(5) According to the fuel cell according to the sixth aspect of the present invention, by disposing the cooling surface sealing member so as to be offset from the communication paths in the vicinity of the reaction gas communication paths, and by disposing the cooling surface sealing member so as to be aligned in a row in the thickness direction with the gas sealing member in areas other than the vicinity of the reaction gas communication paths, an effect is obtained that it is possible to greatly reduce the thickness of the fuel cell stack while preventing increase in cross section thereof.

(6) According to the fuel cell according to the seventh aspect of the present invention, by providing a concave portion in one separator that accommodates the convex portion provided in the adjacent contacting separator, a further reduction in the thickness of the entire fuel cell stack may be desirably achieved.

What is claimed is:

1. A fuel cell comprising fuel cell units, the fuel cell units being stacked and having at least one cooling medium flow passage therebetween, and the cooling medium flow passage sealed by a cooling surface sealing member, each fuel cell unit comprising:

an electrode assembly formed by disposing electrodes on both sides of an electrolyte;

a pair of separators that sandwich the electrode assembly in the thickness direction thereof; and gas sealing members that are disposed at an outer peripheral portion of the electrode assembly, and that seal respective reaction gas flow passages that are formed between each separator and the electrode assembly and are bounded by the separators and electrode assembly, wherein in each of the separators there are provided reaction gas communication ports and cooling medium communication ports that are provided outward from the gas sealing members, and reaction gas communication paths that detour around the gas sealing members in the thickness direction of the separators and connect the reaction gas communication ports with the reaction gas flow passages, wherein the reaction gas communication paths formed in one of the fuel cell units and the corresponding reaction gas communication paths formed in the adjacent fuel cell unit in the stacking direction are disposed so as to be offset with respect to each other as viewed in the stacking direction, and wherein in at least one of the separators, there are provided convex portions that protrude from rear sides of the reaction gas communication paths over at least an area that corresponds to the reaction gas communication paths.

2. The fuel cell according to claim 1, wherein the reaction gas communication paths formed in one of the fuel cell units and the corresponding reaction gas communication paths formed in the adjacent fuel cell unit in the stacking direction are disposed so as to be offset with respect to each other in the direction from the reaction gas communication ports to the reaction gas flow passages as viewed in the stacking direction.

3. The fuel cell according to claim 1, wherein the reaction gas communication paths formed in one of the fuel cell units and the corresponding reaction gas communication paths formed in the adjacent fuel cell unit in the stacking direction are disposed so as to be offset with respect to each other in a direction perpendicular to the direction from the reaction gas communication ports to the reaction gas flow passages as viewed in the stacking direction.

4. The fuel cell according to claim 1, wherein the reaction gas communication paths formed in one of the fuel cell units and the corresponding reaction gas communication paths formed in the adjacent fuel cell unit in the stacking direction are disposed so as to be offset with respect to each other in a diagonal direction with respect to the direction from the reaction gas communication ports to the reaction gas flow passages as viewed in the stacking direction.

5. The fuel cell according to claim 1, wherein the cooling surface sealing member that seals the cooling medium flow passage from the reaction gas communication paths is disposed so as to be offset from the reaction gas communication paths toward the reaction gas communication ports.

6. The fuel cell according to claim 1, wherein the cooling surface sealing member is disposed at a substantially same position as the gas sealing members, as viewed in the stacking direction, except in the vicinity of the reaction gas communication paths.

7. The fuel cell according to claim 1, wherein in at least one of the separators contacting another separator provided with a convex portion that protrudes from rear side of the reaction gas communication path over at least an area that corresponds to the reaction gas communication path, there is provided a concave portion that accommodates the convex portion.

* * * * *